(12) United States Patent
Yadid-Pecht et al.

(10) Patent No.: US 9,609,243 B2
(45) Date of Patent: Mar. 28, 2017

(54) SYSTEMS AND METHODS FOR PROVIDING LOW-NOISE READOUT OF AN OPTICAL SENSOR

(75) Inventors: Orly Yadid-Pecht, Haifa (IL); Terence Tam, Calgary (CA); Graham Jullien, Tecumseh (CA)

(73) Assignee: UTI Limited Partnership, Calgary (CA)

( * ) Notice: Subject to any disclaimer, the term of this patent is extended or adjusted under 35 U.S.C. 154(b) by 1545 days.

(21) Appl. No.: 12/126,762

(22) Filed: May 23, 2008

(65) Prior Publication Data

US 2009/0101798 A1    Apr. 23, 2009

Related U.S. Application Data

(60) Provisional application No. 60/940,341, filed on May 25, 2007.

(51) Int. Cl.
*H01L 27/00*  (2006.01)
*H04N 5/357* (2011.01)
(Continued)

(52) U.S. Cl.
CPC ......... *H04N 5/3575* (2013.01); *H04N 5/3532* (2013.01); *H04N 5/3559* (2013.01);
(Continued)

(58) Field of Classification Search
CPC .. H04N 5/3575; H04N 5/3532; H04N 5/3559; H04N 5/363; H04N 5/365; H04N 5/3742; H04N 5/3745; H04N 5/378
(Continued)

(56) References Cited

U.S. PATENT DOCUMENTS 6,424,375 B1    7/2002  Fowler .......................... 348/241
6,587,142 B1 *  7/2003  Kozlowski et al. .......... 348/241
(Continued)

FOREIGN PATENT DOCUMENTS

EP    1 026 880    8/2000
EP    1 324 592    7/2003
(Continued)

OTHER PUBLICATIONS

Değerli et al., "Analysis and reduction of signal readout circuitry temporal noise in CMOS image sensors for low-light levels," IEEE Transactions on Electron Devices, 47, May 2000.
(Continued)

*Primary Examiner* — Thanh Luu
*Assistant Examiner* — Kevin Wyatt

(57) ABSTRACT

Systems, methods, and apparatuses that may be employed to reduce noise in an electronic circuit are described. Systems are provided that include a circuit, wherein the circuit is configured to provide an active reset technique and an active column sensor readout technique. Methods for reducing circuit noise are also provided. The methods include providing a circuit configured to perform an active reset technique and an active column sensor readout technique. The methods further provide that the active reset technique and the active column sensor readout technique are both performed by the circuit. An imaging apparatus is provided that includes an array of photo-sensitive pixels, wherein each of the pixels can include a circuit configured to provide an active reset technique and an active column sensor readout technique. The active reset technique and the active column sensor readout technique are executable on the circuit.

9 Claims, 26 Drawing Sheets

(51) Int. Cl.

| | |
|---|---|
| H04N 5/353 | (2011.01) |
| H04N 5/355 | (2011.01) |
| H04N 5/363 | (2011.01) |
| H04N 5/365 | (2011.01) |
| H04N 5/374 | (2011.01) |
| H04N 5/3745 | (2011.01) |
| H04N 5/378 | (2011.01) |

(52) U.S. Cl.
CPC ............. *H04N 5/363* (2013.01); *H04N 5/365* (2013.01); *H04N 5/378* (2013.01); *H04N 5/3742* (2013.01); *H04N 5/3745* (2013.01)

(58) Field of Classification Search
USPC ...................... 250/208.1; 348/241, 300–301
See application file for complete search history.

(56) References Cited

U.S. PATENT DOCUMENTS

| | | | | |
|---|---|---|---|---|
| 6,777,660 | B1* | 8/2004 | Lee ............................ | 250/208.1 |
| 7,280,143 | B2 | 10/2007 | Mentzer ........................ | 348/308 |
| 7,391,453 | B2* | 6/2008 | Ohkawa ........................ | 348/302 |
| 7,544,921 | B2* | 6/2009 | Boemler ................... | 250/214 A |
| 2004/0201761 | A1 | 10/2004 | Mentzer ........................ | 348/308 |
| 2005/0057680 | A1* | 3/2005 | Agan ............................ | 348/362 |
| 2005/0068439 | A1* | 3/2005 | Kozlowski et al. ........... | 348/308 |
| 2007/0177043 | A1* | 8/2007 | Kok ............................. | 348/308 |

FOREIGN PATENT DOCUMENTS

| | | |
|---|---|---|
| EP | 1 351 490 | 10/2003 |
| GB | 2 400 173 | 8/2006 |

OTHER PUBLICATIONS

Kawahito et al., "12.7: A column-based pixel-gain-adaptive-CMOS image sensor for low-light-level imaging," IEEE International Solid-State Circuits Conference, 2003.

Liu et al., "CCD/CMOS hybrid FPA for low light level imaging," *Proceedings of the SPIE*, 5881: 79-87, 2005.

Mendis et al., "Progress in CMOS active pixel image sensors," The International Society for Optical Engineering, 2172:19-29, Feb. 1994, Abstract.

Pain et al., "A single-chip programmable digital CMOS imager with enhanced low-light detection capability," Proceedings of the 13th International Conference on VLSI Design, 2000.

Tam et al., "A low noise CMOS imager employing feedback reset and readout," manuscript received Mar. 1, 2007.

Tam et al., "A low noise CMOS imaging biosensor array for lab-on-a-chip applications," IEEE International Symposium, pp. 1100-1103, May 2008.

Tam, "A CMOS active pixel sensor contact imager for cell detection in biosensing applications," Thesis Oral Examination, Feb. 5, 2007.

Tam, "A CMOS active pixel sensor contact imager for cell detection in biosensing applications," Thesis—Department of Electrical and Computer Engineering, Calgary, Alberta, Canada, Feb. 2007.

Chen and Kleinfelder, "CMOS active pixel sensor achieving 90 dB dynamic range with column-level active reset," *Proc. SPIE*, 5301:438-449, 2004.

Fowler et al., "Low noise readout using active reset for CMOS APS," *Proc. SPIE Sensors and Camer Systems for Scientific, Industrial, and Digital Photography Applications*, 3965:126-135, 2000.

Kawahito et al., "A column based pixel-gain adaptive CMOS image sensor for low light level imaging," *IEEE ISSCC Dig. Tech. Papers*, 1:224-490, 2003.

Kleinfelder et al., "Novel integrated CMOS sensor circuits," *IEEE Trans. Nuclear Science*, 51:2328-2336, 2004.

Pain et al., "Reset noise suppression in two-dimensional CMOS photodiode pixels through column-based feedback-reset," *IEDM 2002 Digest*, 809-812, 2002.

Shcherback et al., "Active-area shape influence on dark current of CMOS imagers," *Proc. SPIE*, 4669:117-124, 2002.

Tian et al., "Analysis of temporal noise in CMOS photodiode active in pixel sensor," *IEEE J. Solid State Circuits*, 36:92-101, 2001.

Vogelsong et al., "Scientific/industrial camera-on-a-chip using active column sensor CMOS imager core," *Proc. SPIE*, 3965: 102-113, 2000.

Yadid-Pecht et al, "Optimization of noise and responsivity in CMOS active pixel sensors for detection of ultralow-light levels," *Proc. SPIE development and application s of solid-state sensor array*, 3019:125-136, 1997.

Zarnowski et al, "1.5-FET-per pixel standard CMOS active column sensor," *Proc. SPIE Sensors, Cameras, and Systems for Scientific/Industrial Applications*, 3649-186-196,1999.

"Image sensor architectures for digital cinematography," in Whitepaper: DALSA Corporation, 2005.

Ardeshirpour et al., "2-D CMOS Based Image Sensor System for Auorescent Detection," *Canadian Conf Electrical and Computer Engineering*, 3:1441-1444, 2004.

Baker et al., "Imaging brain activity with voltage- and calcium-sensitive dyes," *Cell Mol Neurobiol.*, 25(2):245-282, 2005.

Catrysse and Wandell, "Integrated color pixels in 0.18-μm complementary metal oxide semiconductor technology," *J. Opt. Soc. Am. A.*, 20(12): 2293-2306, 2003.

Chien and Pine, "Voltage-sensitive dye recording of action potentials and synaptic potentials from sympathetic microcultures," *Biophys J.*, 60(3): 697-711, 1991.

Colicos and Syed, "Neuronal networks and synaptic plasticity: understanding complex system dynamics by interfacing neurons with silicon technology," *J. Exp. Biol.*, 209:2312-2319, 2006.

Decker et al., "A 256×256 CMOS Imaging Array with Wide Dynamic Range Pixels and Column-Parallel Digital Output," *IEEE J. Solid State Circuits*, 33: 2081-2091, 1998.

Definition of "Plasticity," in Merriam-Webster's Dictionary, accessed on Mar. 2, 2012.

Diller et al., "Advanced Output Chains for CMOS Image Sensors Based on Active Column Sensor Approach," *Sensors and Actuators A: Physical*, 116:304-311, 2004.

Eltoukhy et al., "A 0.18-μm CMOS bioluminescence detection lab-on-chip," *IEEE J. Solid State Circuits*, 41:651-662, 2006.

Eversmann et al., "A 128×128 CMOS biosensor array for extracellular recording of neural activity," *IEEE Journal of Solid State Circuits*, 38(12): 2306-2317, 2003.

Eversmann et al., "CMOS sensor array for electrical imaging of neuronal activity," *IEEE International Symposium on Circuits and Systems*, 4:3479-3482, 2005.

Findlater et al., "Source follower noise limitations in CMOS active pixel sensors," *Proc. SPIE Detectors and Associated Signal Processing 5251*, 187, 2004.

Fromherz, "Joining Ionics and Electronics: Semiconductor Chips with Ion Channels, Nerve Cells, and Brain Tissue," *IEEE ISSCC Dig. Tech. Papers*, 1:76-77, 2005.

Gamal et al., "Modeling and estimation of FPN components in CMOS image sensors," *Proc. SPIE*, 3301:168-177, 1998.

Ghallab et al., "A novel CMOS lab-on-a-chip for biomedical applications," *IEEE ISCAS*, 2:23-26, 2005.

Ghallab et al., "Sensing methods for dielectrophoresis phenomenon: from bulky instruments to lab-on-a-chip," *IEEE Circuits and Systems Magazine*, 4:5-15, 2004.

Guerrero et al., "Dyed red, green, and blue photoresist for manufacture of high-resolution color filter arrays for image sensors," *Proc. SPIE*, 5017: 298-306, 2003.

Iordanov et al., "Integrated Sensor Arrays for Bioluminescence and Fluorescence Bio-Chemical Analysis," *IEEE Proc. Sensors*, 2:24-27. 2004.

Iordanov et al., "Silicon thin-film UV filter for NADH fluorescence analysis," *Sensors and Actuators A: Physical*, 97-98: 161-166, 2002.

Ji et al., "CMOS contact imager for monitoring cultured cells," *IEEE ISCAS*, 4:3491-3494, 2005.

(56) References Cited

OTHER PUBLICATIONS

Kaul et al., "Neuron-semiconductor chip with chemical synapse between identified neurons," *Phys. Rev. Lett.*, 92(3): 038102, 2004.
Kleinfelder et al., "A 10,000 Frames/s CMOS Digital Pixel Sensor," *IEEE J. Solid-State Circuits*, 36:2049-2059, 2001.
Kwon et al., "The analysis of dark signals in the CMOS APS imagers from the characterization of test structures," *IEEE Transactions on Electron Devices*, 51(2): 178-184, 2004.
Manaresi et al., "A CMOS chip for individual cell manipulation and detection," *IEEE J. Solid-State Circuits*, 38:2297-2305, 2003.
Medoro et al., "A Lab-On-A-Chip for Cell Detection and Manipulation," *IEEE Sensors Journal*, 3(3): 317-325, 2003.
Mendis et al., "CMOS active pixel image sensor," *IEEE Trans. Electron Devices*, 41:452-453, 1994.
Mendis et al., "CMOS active pixel image sensors for highly integrated imaging systems," *IEEE J. Solid•State Circuits*, 32(2): 187-196, 1997.
Ng et al., "A new neural imaging approach using a CMOS imaging device," *Conf Proc IEEE Eng Med Biol Soc.*, 1:1061-1064, 2006.
Ohta et al., "Pulse modulation CMOS image sensor for bio-fluorescence imaging applications," *IEEE ISCAS*, 4:3487-3490, 2005.
Pain et al., "An enhanced-performance CMOS imager with a flushed-reset photodiode pixel," *IEEE Transactions on Electron Devices*, 50(1): 48-56, 2003.
Reichman, *Handbook of Optical Filters for Fluorescence Microscopy*, in Chroma Technology Corporation Resources, 2000.
Romani et al., "Capacitive sensor array for localization of bioparticles in CMOS lab-on-a-chip," *ISSCC Dig. Tech. Papers*, 1:224-225, 2004.
Tam et al., "A CMOS contact imager for cell detection in bio-sensing applications," *IEEE ISCAS*, 813-816, 2007.
Tian et al., "Active Pixel Sensors Fabricated in a Standard 0.18 CMOS um Technology," *Proc. SPIE*, 4306:441-449, 2001.
Tokuda et al., "A CMOS optical/potential image sensor with 7.5 um pixel size for on-chip neural and DNA spot sensing," *Conf Proc IEEE Eng Med Biol Soc.*, 7:7269-7272, 2005.
Yadid-Pecht et al., "Optimization of noise and responsivity in CMOS active pixel sensors for detection of ultralow-light level," *Proc. SPIE 3019*, 125, 1997.
Yadid-Pecht et al., "Wide intrascene dynamic range CMOS APS using dual sampling," *IEEE Trans. Electron Devices*, 44:1721-1723, 1997.
Yaung et al., "Nonsilicide source/drain pixel for 0.25-μm CMOS image sensor," *IEEE Electron Device Letters*, 23:71-73, 2001.
Yotter et al., "A Review of Photodetectors for Sensing Light Emitting Reporters in Biological Systems," *IEEE Sensors J.*, 3:288-303, 2003.

\* cited by examiner

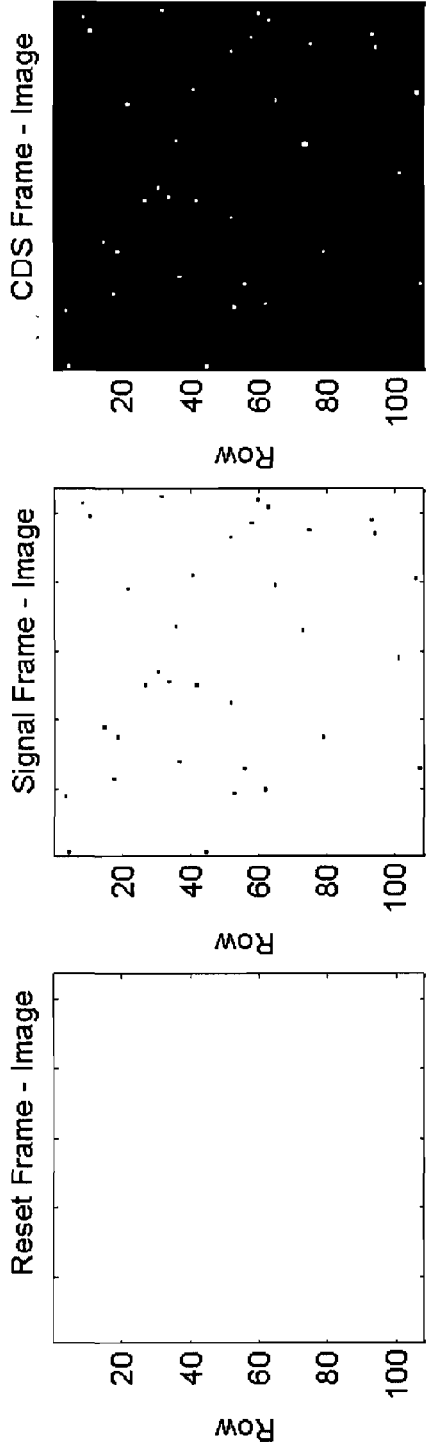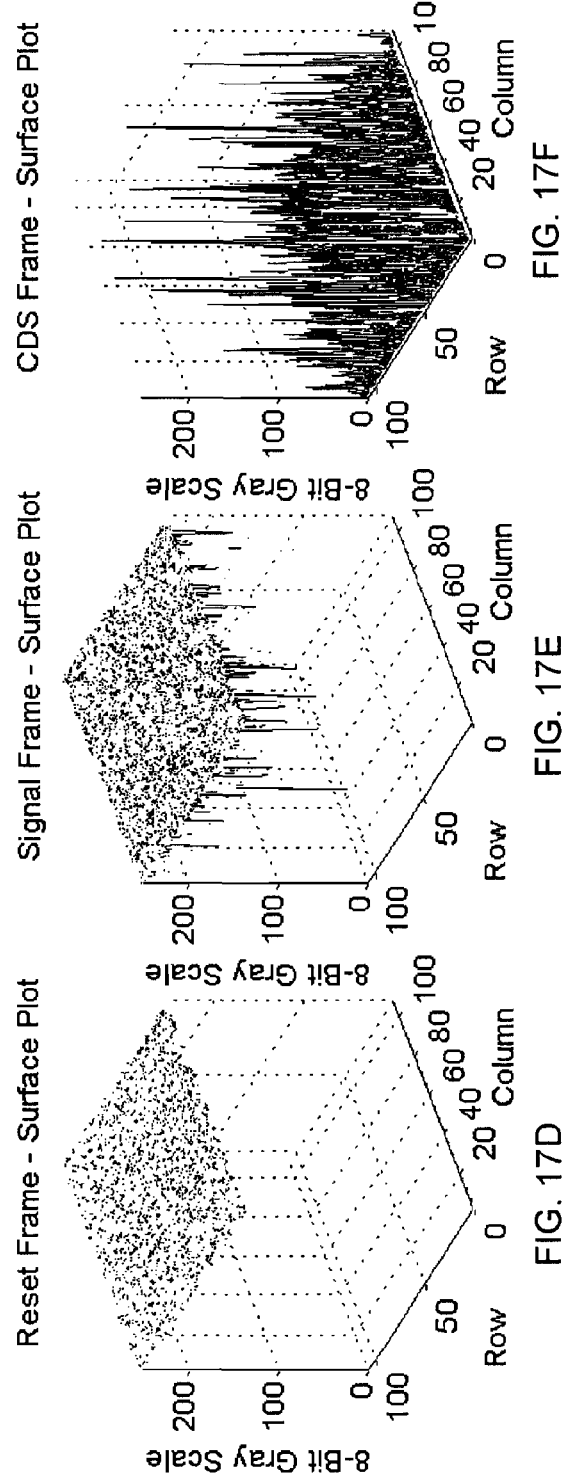

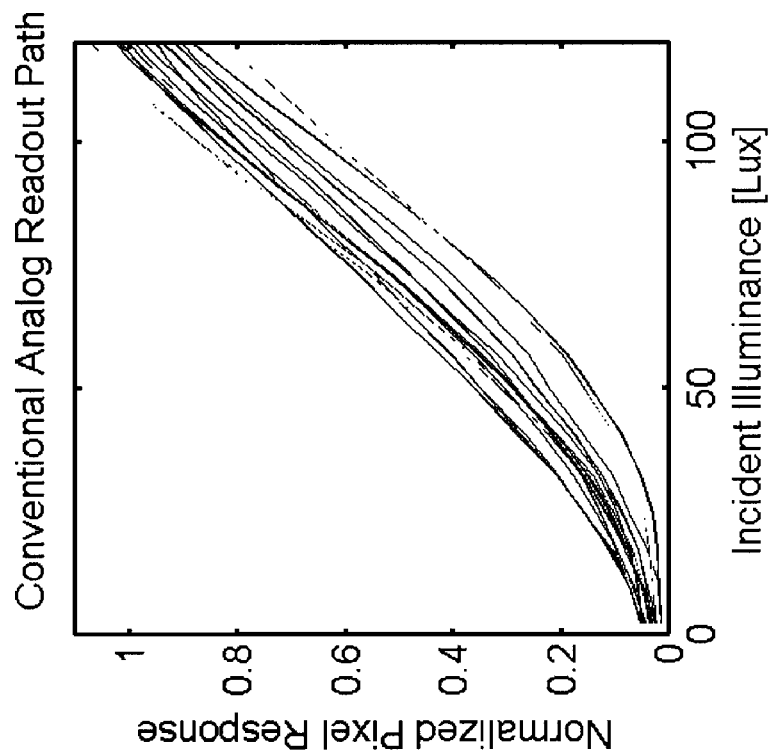
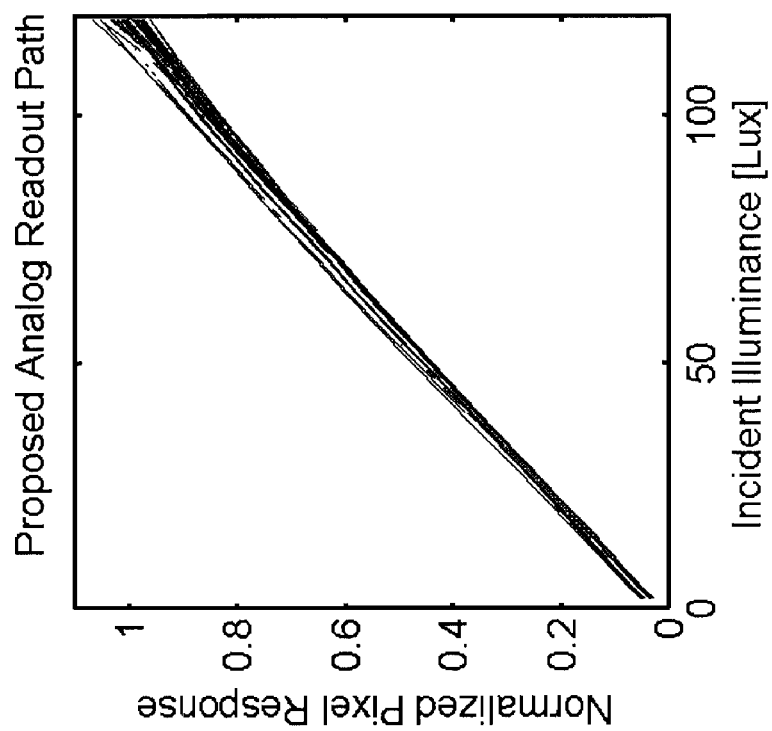
FIG. 19B
FIG. 19A

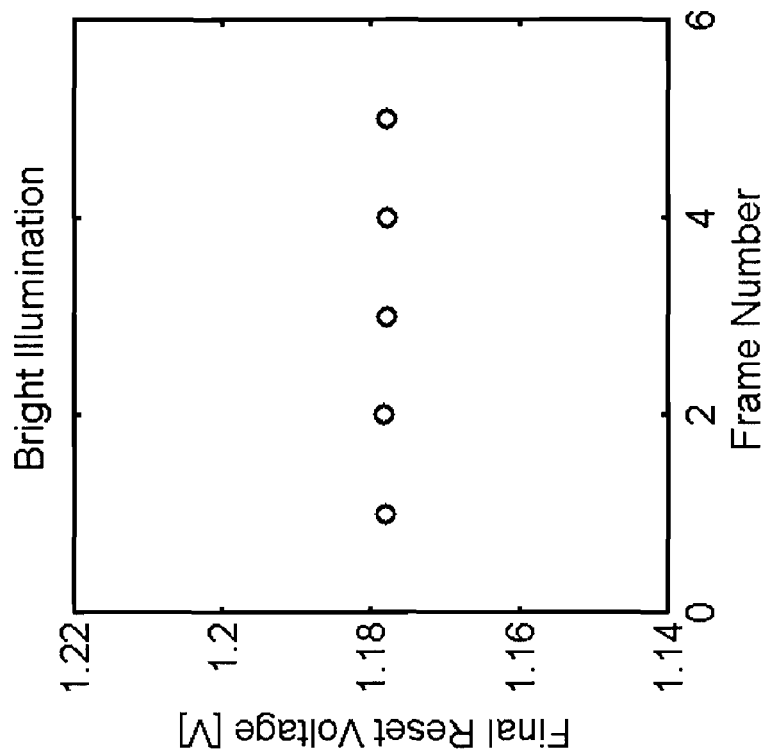
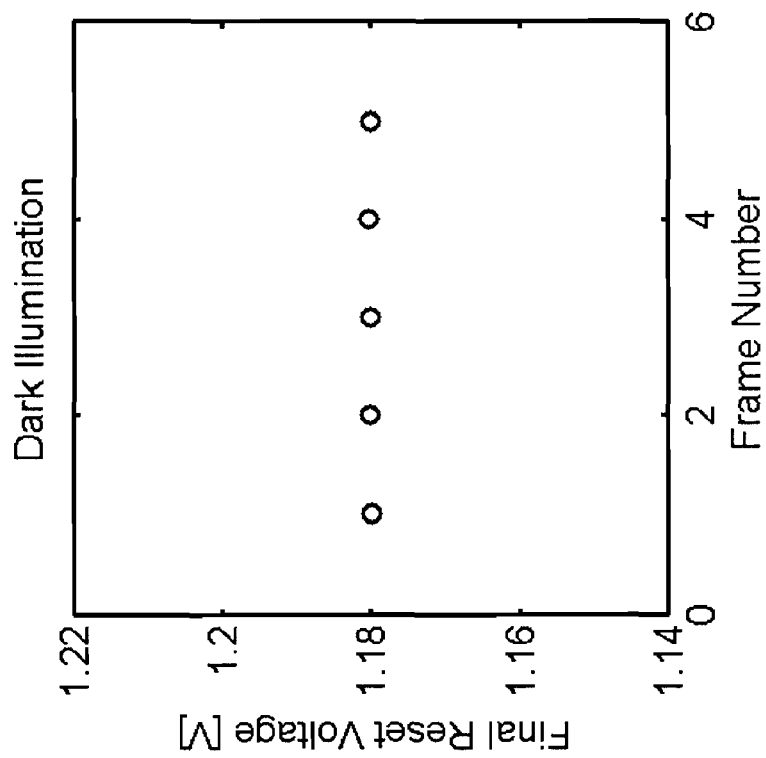

SYSTEMS AND METHODS FOR PROVIDING LOW-NOISE READOUT OF AN OPTICAL SENSOR

CROSS-REFERENCE TO RELATED APPLICATIONS

This application is a utility application of and claims priority to U.S. Patent Application Ser. No. 60/940,341, filed May 25, 2007.

TECHNICAL FIELD

This document generally relates to electronic circuits and methods for solid state image sensing devices.

BACKGROUND

Digital imaging can be the creation of a digital image of a physical object. A camera, or similar device, can capture information directly from a physical scene or object. The camera can include electronics that can digitally gather and store sufficient information that can be used to reconstruct an image of the original scene or object. For example, the reconstructed digital image can be viewed on a monitor or display, printed on a printer, or stored on a data storage device. The image can include digital data that can be analyzed, manipulated and processed to obtain information about the object or scene that was captured. The image data can also be processed resulting in possible image modifications and improvements. The digital image data can also be provided by a scanner or similar device which can create a digital representation of, for example, a picture, photograph or other printed paper images.

SUMMARY

This document describes systems, methods, and apparatuses that may be employed to reduce noise in an electronic circuit. In one embodiment, a system is provided comprising a circuit, wherein the circuit is configured to provide an active reset technique and an active column sensor readout technique. The active reset technique and said active column sensor readout technique can be performed by the circuit autonomously during a reset phase or a sampling phase respectively. Further, the active reset technique and the active column sensor readout technique can share common circuitry, and in some embodiments, the shared common circuitry is configured as an amplifier. In such embodiments, the amplifier can be partitioned between pixel circuitry and column circuitry. In some embodiments, the amplifier can be a folded cascade amplifier.

The amplifier can be configurable to provide necessary input terminal polarity to accomplish an active reset technique or an active column sensor readout technique. In some implementations, the operational configuration of the amplifier can be controlled by a control signal, and further, the amplifier can perform the active reset technique or the active column sensor readout technique based on an input control signal. In certain embodiments, the amplifier can be configured in a unity gain mode of operation during the active column sensor technique and can be configured as a high gain amplifier during the active reset technique. In some implementations of the system, the active reset technique can be preceded by hard reset.

One embodiment provides that the system can be an imaging system, and in some implementations, the imaging system can be a complementary metal oxide semiconductor, active pixel sensor imaging system. In still other embodiments, the pixels contained in the active pixel sensor imaging system can be read using a rolling shutter readout technique.

In another embodiment, a method for reducing circuit noise is provided. The method includes providing a circuit configured to perform an active reset technique and an active column sensor readout technique. The method further provides that the active reset technique and the active column sensor readout technique are both performed by the circuit.

In some implementations of the method, the circuit is configured as an amplifier. The active reset technique can used to decrease ambiguity in reset voltage, and the active column sensor readout technique can be used to decrease pixel level gain fixed pattern noise, according to one embodiment. In some implementations, the active reset technique can be used to decrease reset noise, and the active column sensor readout technique can be used to decrease pixel level gain fixed pattern noise. Furthermore, the active reset technique can be used during a reset phase, and the active column sensor readout technique can be used during a sampling phase in some embodiments. An input terminal polarity to the amplifier can determines whether the amplifier performs the active reset technique or the active column sensor technique. In some implementations of the method, the amplifier can be configured in a unity gain mode of operation during the active column sensor readout technique and configured as a high gain amplifier during the active reset technique.

In some embodiments of the method, the amplifier can be a folded cascade amplifier. In some embodiments the high gain amplifier can increase an effective capacitance for suppression of thermal reset noise. A feedback reset loop can be disabled during the active column sensor readout technique, thereby reverting to a lower effective capacitance dominated by a photodiode capacitance, thereby permitting a high charge-to-voltage gain/sensitivity for readout.

In another embodiment, an imaging apparatus is provided that comprises an array of photo-sensitive pixels, wherein each of the pixels comprises a circuit configured to provide an active reset technique and an active column sensor readout technique, wherein the active reset technique and the active column sensor readout technique are executable on the circuit.

In yet another embodiment, an imaging apparatus is provided that comprises an array of imaging pixels, the imaging pixels being arranged in rows and columns, wherein each imaging pixel comprises a light-sensitive photodiode, a reset transistor, a switch in a feedback path, at least one transistor of a differential pair of transistors belonging to a partitioned amplifier having a plurality of transistors, and a row select transistor. The imaging apparatus further includes peripheral circuitry comprising transistors of the partitioned amplifier, and multiplexers. The partitioned amplifier can be configurable as means for implementing an active reset technique in one phase of imaging, and configurable as a means for implementing an active column sensor readout technique in another phase of imaging.

In some implementations of the imaging apparatus, the partitioned amplifier includes a single-stage, differential-input, single-output, amplifier with an active current mirror. The peripheral circuitry can service imaging pixels within a column. At least one transistor of said differential pair of transistors belonging to said partitioned amplifier and said row select transistor of a plurality of imaging pixels can be connected in parallel to a remainder of common, partitioned amplifier circuitry at the periphery. The partitioned amplifier can comprise a first branch and a second branch, wherein the first branch serves as an amplifier output during a reset phase, and the second branch can serve as an amplifier output during a readout phase.

In some implementations, the switch can include a pass transistor or a transmission gate. The row select transistor and the switch of an imaging pixel can be activated by a same row select control signal. In this implementation, the row select control signal can determine which row of imaging pixels within the array are connected to the peripheral circuitry. A multiplexer can establish the feedback path for active reset, connecting a corresponding amplifier output to a gate of the reset transistor via the switch in the feedback path. Furthermore, the multiplexer can establish a unity gain feedback loop for an active column sensor readout, connecting the corresponding amplifier output to a negative input terminal of the partitioned amplifier. A multiplexer can control an input terminal polarity of the partitioned amplifier by specifying an orientation of an active current mirror in some implementations. In many implementations, the multiplexer can include pass transistors or transmission gates.

In some implementations, a polarity of an input terminal of the partitioned amplifier coupled to a node of the photodiode can be toggled by connecting a common gate node of an active current mirror contained in peripheral circuitry to either corresponding branch nodes of the amplifier, thereby defining an input current branch and an output current branch of the active current mirror. In such implementations, the corresponding branch node of the output current branch of said active current mirror is the amplifier output.

The details of one or more implementations are set forth in the accompanying drawings and the description below. Other features, objects, and advantages will be apparent from the description and drawings, and from the claims.

DESCRIPTION OF DRAWINGS

The foregoing summary as well as the following detailed descriptions of various implementations will be better understood when read in conjunction with the appended drawings. It should be understood, however, that preferred implementations are not limited to the precise arrangements and instrumentalities shown herein. The components in the drawings are not necessarily to scale, emphasis instead being placed upon clearly illustrating the principles of various implementations.

FIGS. 17A-F show sensor images and accompanying surface plots for a reset frame, sample frame, and a CDS frame.

FIGS. 19A-B show a comparison of the normalized inter-column responses for an imager that can be implemented using the circuit of FIG. 8 (FIG. 19A), compared to a conventional imager that can use the implementation of FIG. 2 (FIG. 19B).

FIGS. 22A-B are graphs of measured rest voltage under dark illumination and bright illumination.

Like reference symbols in the various drawings indicate like elements.

DETAILED DESCRIPTION OF ILLUSTRATIVE EMBODIMENTS

Desirable characteristics of many electronic instruments include a high signal-to-noise ratio and simplified, or reduced circuitry, the latter of which can reduce cost of the instrument and provide simpler engineering. Electronic noise reduction techniques can improve signal resolution and can permit more sensitive measurements, both of which can be advantageous in many instrumental applications. The following discloses systems, methods, and apparatuses that employ a circuit capable of performing at least two noise-reducing techniques within a simplified, or reduced circuit architecture.

Figure 1:
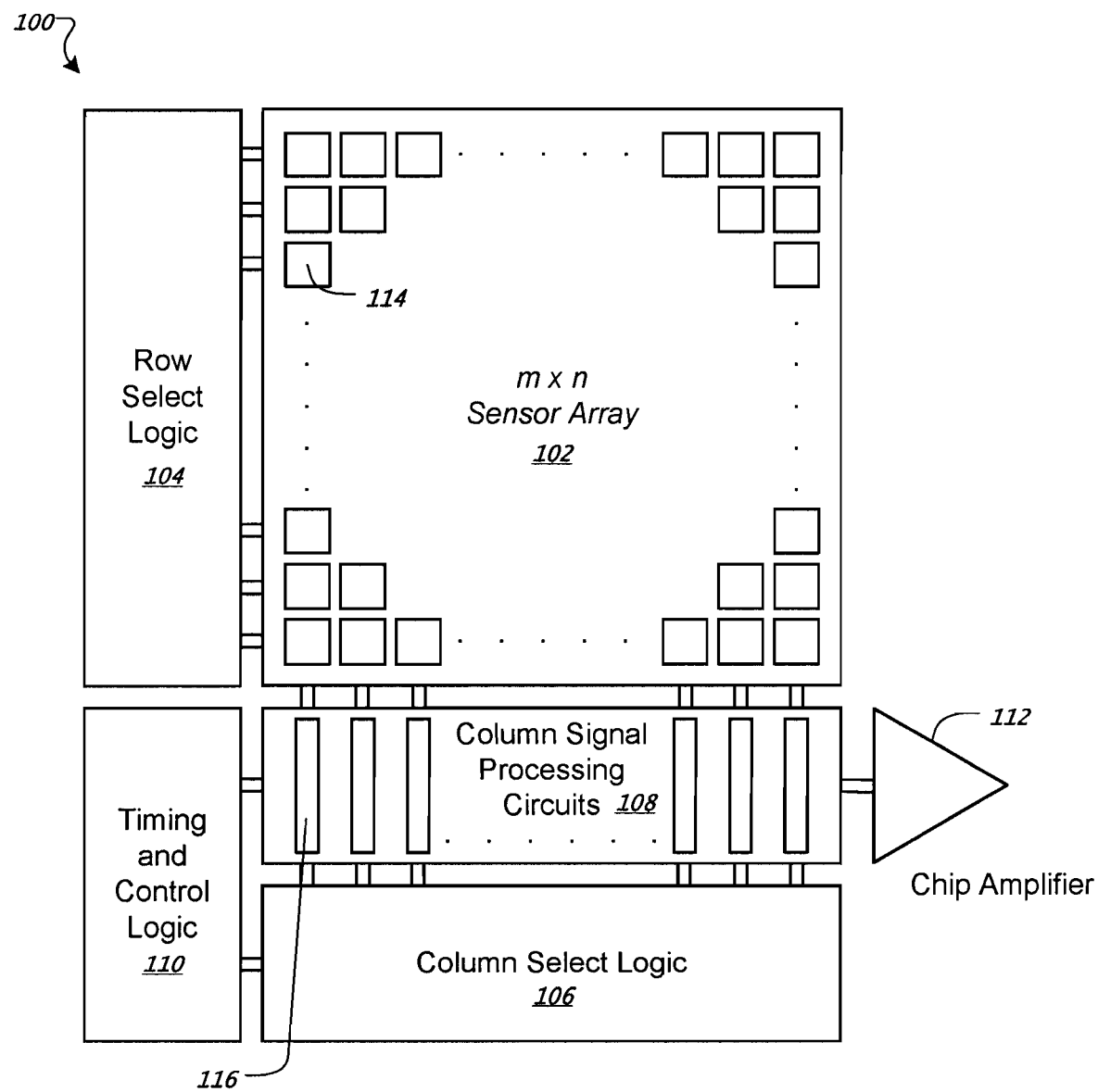
FIG. 1 shows a block diagram of one implementation of a digital imaging system.

FIG. 1 shows a block diagram of a digital imaging system according to one embodiment. The digital imaging system 100 can include a sensor array 102, row select logic 104, column select logic 106, column signal processing circuits 108, timing and control logic 110, and a column/chip level readout amplifier 112.

The sensor array 102 can include pixels, which can be referred to as an active pixel sensor (APS) (e.g., APS 114), arranged in m rows by n columns, where m and n can be whole numbers greater than 1. Each pixel (e.g., APS 114) in the array 102 can include a photodetector and associated readout and reset circuitry. Each pixel in the array may also be referred to as a photo-sensitive pixel. An implementation of an APS is shown and described in more detail in FIGS. 2-6.

Each column of pixels in the array 102 can have associated with it column sensing that can be included in the column signal processing circuits 108. The column circuitry can include associated circuitry for reset and readout of the accumulated charge contained within each pixel included in the active column. In one implementation, each pixel within the column can use the same electronics that perform the functions of reset and readout. For example, column sensing circuitry 116 can be associated with one pixel in the column (e.g., pixel 114). An implementation of column circuitry is shown and described in more detail in FIGS. 2-6.

Row select logic 104 can allow one row of pixels within the array 102 to be processed at one time. Column select logic 106 can select one column within the array 102 to be selected at one time. The timing and control logic 110 can control the timing of the row select logic, column select logic, and the selection of the column signal processing circuits 108 to allow for the reset or readout of each pixel in the array. In one implementation, the readout is performed in a sequential order. Amplifier 112 can amplify the resultant electrical signal determined from the pixel charge accumulation per pixel. This amplified electrical charge can be used in other circuitry included with the digital imaging system. Non-limiting examples of these systems and devices are given below.

Figure 2:
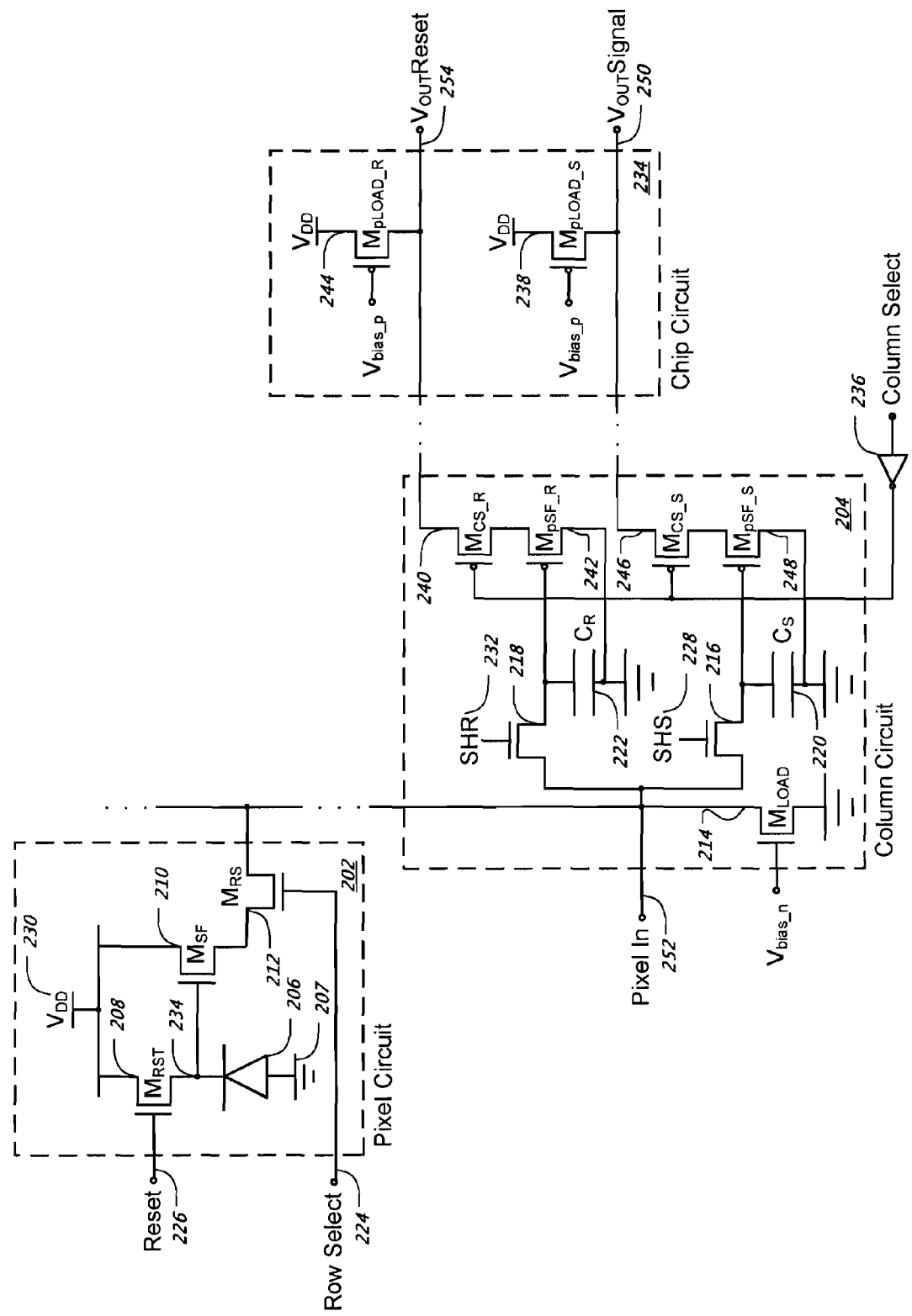
FIG. 2 is a diagram of a pixel circuit, a column circuit, and a chip circuit that can be used in a digital imaging system, according to one implementation.

FIG. 2 is a diagram of an implementation of a pixel circuit 202, a column circuit 204, and a chip circuit 235 that can be used in a digital imaging system, according to one implementation. Referring to FIG. 1, the pixel circuit 202 can be an implementation of APS 114, the column circuit 204 can be an implementation active column signal processing circuit 108, and the chip circuit 234 can be an implementation of the chip amplifier 112. Gate 236 can be included in the column select logic 106. The digital imaging system implemented in FIG. 2 may also be referred to as a 3T Complimentary Metal Oxide Semiconductor (CMOS) APS imager due to the use of three transistors (e.g., transistors 208, 210, 212) in the pixel circuit (e.g., pixel circuit 202). Pixel circuit 202 includes photodiode 206, and transistors 208, 210, 212. The anode of photodiode 206 can be coupled to a ground signal (GND) 207, and the cathode can be coupled to the source of transistor 208 ($M_{RST}$), and the gate of transistor 210 ($M_{SF}$). The source of transistor 210 can be coupled to the drain of transistor 212 ($M_{RS}$). The gate of transistor 212 can be coupled to a row select line, which can be an output of the row select logic 104. The source of transistor 212 can be coupled to an input of the column circuit 204. The column circuit 204 can be selected from the column signal processing circuits 108 by gate 236 of column select logic 106.

In some implementations, photodiode 206, transistor 208, transistor 210, and transistor 212 can form a CMOS APS pixel (e.g., pixel 114). In this implementation, the photodiode 206 can be the light sensitive element of the APS pixel. Light directed to the photodiode 206 can cause an accumulation, or integration, of charge which can be stored in the parasitic capacitance of the photodiode 206. This results in a voltage charge across the photodiode 206 that is representative of the incident light.

The photodiode 206 can typically operate in three states: photodiode reset, photodiode integration, and photodiode sampling. Transistor 208 can be referred to as a reset transistor ($M_{RST}$). Transistor 208, when turned ON by Reset signal 226, can reset the photodiode 206 by charging it to a reverse bias voltage. This can be accomplished by bringing the cathode of the photodiode 206 to an internal circuit voltage 230, $V_{DD}$, minus the drain-to-source voltage drop ($V_{DS}$) across the transistor 208. The voltage at the cathode of the photodiode 206 is greater than the voltage at the anode of the photodiode 206, and the photodiode 206 is in reverse bias mode. This results in the removal of accumulated electron-hole pairs. It can also allow for the widening of the depletion region to improve charge collection efficiency during the next charge integration process.

The reset transistor can act as a switch to reset the APS pixel. Since the transistor is an n-type Field Effect Transistor (FET), the reset of the pixel can be referred to as a "soft reset". The voltage at the source of the reset transistor is greater than the voltage at the gate of the transistor minus the transistor threshold voltage.

During the charge integration process, transistor 208 can be turned OFF by Reset signal 226. Therefore, the photodiode 206 can be forward biased which can allow the photodiode 206 to accumulate photo-generated charges. This can result in the discharge in photodiode capacitance proportional to the incident illumination on the photodiode.

During the sampling phase, transistor 208 remains OFF. Transistor 210 can be referred to as a source follower transistor ($M_{SF}$). Transistor 210 can act as an amplifier which can provide a representative voltage corresponding to the charge accumulation on the photodiode 206. Transistor 212 can be referred to as a row select transistor ($M_{RS}$). Row select signal 224 can turn ON transistor 212. Transistor 212 can enable the representative voltage of the photodiode charge accumulation, amplified by transistor 210, to the column circuit 204, specifically, load transistor 214 ($M_{LOAD}$). Transistor 214 can be shared by all pixels in a column, however, it is connected to each of these pixels individually, on a row by row basis. The row select transistor 212 can enable a single row of the sensor array to be enabled to the corresponding column circuitry. The column circuit 204 can process the signal allowing it to be input to the chip circuit 234 and then readout to additional system circuitry when column select transistors 240 and 246 are biased on.

In some implementations, a rolling shutter readout method can be used for the readout of pixels from the sensor array row by row in a column by column fashion. For example, one row of pixels can be accessed and pixel values can be read out from left to right. This process can be repeated for the next row of pixels, and so on, until all of the pixels have been read. The implementation of FIG. 2, a readout path for the photodiode reset voltage includes transistors 240, 242, 244. When biased to a conducting state, the transistor 240 allows the accumulated reset voltage at capacitor 220 to be readout at output 254 ($V_{out}$Reset). Similarly, the readout path for the photodiode sampled voltage includes transistors 246, 248, and 238. When biased to a conducting state, the transistor 246 allows the accumulated sample voltage at capacitor 222 to be readout at output 250 ($V_{out}$Signal). This is described in greater detail below.

For example, during a row access period, all pixels within a row can be activated by raising the row select signal. This can allow the row select transistor ($M_{RS}$) in each row to connect the source follower transistor ($M_{SF}$) in each pixel circuit to its respective column-level load transistor ($M_{LOAD}$) included in its respective column circuit. The column circuit also includes other circuitry that can be used for the readout of the respective pixel value.

In the implementation of FIG. 2, when row select signal 224 is raised, transistor 212 can connect transistor 210 to transistor 214. The column circuit 204 can be coupled to all of the pixel circuits in the same column as pixel circuit 202. When the row select signal 224 is raised, pixel circuit 202 can be connected to column circuit 204. Specifically, the source of transistor 212 can be coupled to the drain of transistor 214. The integrated signal voltage from photodiode 206 can be sampled by the source follower transistor 210 ($M_{SF}$) and stored on a column-level sample-and-hold capacitor 220 ($C_S$) by activating a sample-and-hold signal 228 (SHS). The source of transistor 212 can be coupled to the drain of transistor 214 as well as the source of transistors 216 and 218. The activation of sample-and-hold signal 228 to the gate of transistor 216 can enable the charging of the sample-and-hold capacitor 220, which is coupled to the drain of transistor 216. The charge stored in the capacitor 220 can be directly related to the integrated signal voltage from photodiode 206.

Following sampling, photodiode 206 can be reset by activating the Reset signal 226. The photodiode 206 can be charged to approximately a threshold voltage below a supply voltage 230 ($V_{DD}$). The reset voltage from photodiode 206 can be sampled by the source follower transistor 210 ($M_{SF}$) and stored on a column-level sample-and-hold capacitor 222 ($C_R$) by activating a sample-and-hold signal 232 (SHR). The activation of sample-and-hold signal 232 to the gate of transistor 218 can enable the charging of the sample-and-hold capacitor 222, which is coupled to the drain of transistor 218. The charge stored in the capacitor 220 can be directly related to the reset voltage from photodiode 206.

The sampling of the integrated signal voltage from photodiode 206 and the reset voltage from photodiode 206 can be referred to as a row access period. Next, a readout period can be initiated. During the readout period, the column stored signal voltages and reset voltages can be readout sequentially, for example, from left-to-right. Upon the completion of the readout, the capacitors 220,222 can be free to take on new photodiode values during the following row access period. The integration period (the time during which photodiode 206 accumulates photo-generated charges) can span from the end of the photodiode reset to the start of the photodiode sampling.

In some implementations, the sampled pixel reset voltage can be subtracted from the sampled integrated signal voltage. This can provide correction for correlated noise sources which can be common in both sample readouts. This double sampling technique can be known as correlated double sampling (CDS). In the digital imaging system implementation of FIG. 2, the storage of the reset voltage of the photodiode during integration may not be possible. A "read-first reset-later" sampling sequence can be used, which was described above. In this sampling sequence, the pixel signal voltage from the current frame is sampled first, the pixel is reset, and then the pixel reset voltage from the following frame is sampled. A frame can be one of many still images of a scene which can compose the final complete picture of the scene. Under this sampling sequence, however, reset noise may not be removed from the sampled pixel voltage as the sampled reset voltage and the sampled pixel voltage are derived from the same frame. Therefore, under these conditions, a true correlated double sampling technique may not be performed.

In some implementations, CMOS APS imagers can be fabricated using standard CMOS fabrication technology. The use of standard fabrication technology can lead fabrication related noise issues in the CMOS APS imager. The signal-to-noise ratio (SNR) under low light conditions may need to be improved in order to assure that the magnitude of a photo-generated signal is greater than the noise floor of the CMOS APS imager.

Figure 3:
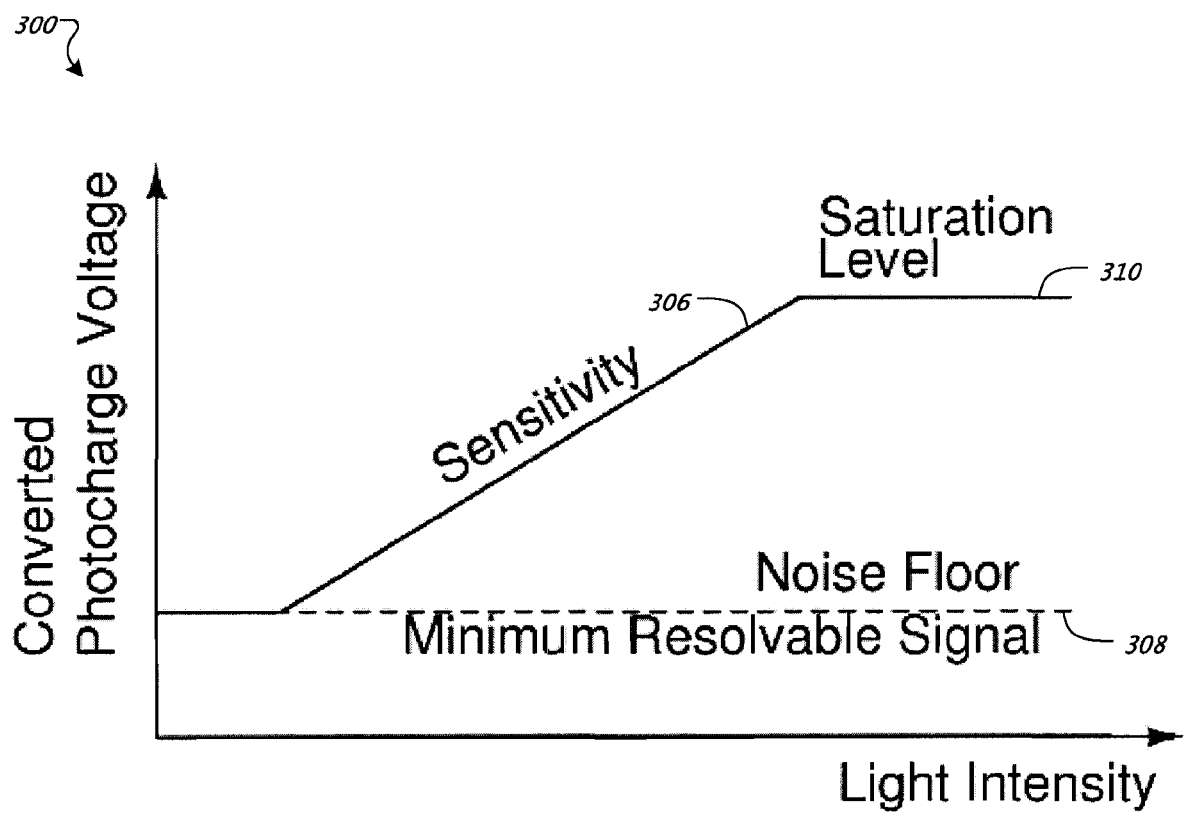
FIG. 3 is a graph of converted photo-charge voltage vs. light intensity on a photodiode.

FIG. 3 is a diagram of an example graph 300 of converted photo-charge voltage as a function of vs. light intensity on a photodiode. Referring to FIG. 2, for example, the graph 300 can show the light intensity on photodiode 206 on the x axis plotted against the converted photo-charge voltage, which can be the readout value, on the y-axis.

In some implementations of a digital imaging system, it may be desirable to have increased photodetector (e.g., photodiode 206) sensitivity, a decreased noise floor (temporal noise), and decreased background non-uniformity (spatial noise). Noise can be a measure of the accuracy with which the incident light on the photodetector can be measured.

The graph 300 shows that a high pixel sensitivity can increase the slope of the response curve 306. This can enhance the differentiation between faint levels of illumination from pixel to pixel, which can contribute to improvements in intra-scene contrast. A high pixel sensitivity can also contribute to maximizing the SNR for the pixel. A low noise floor 308 may be beneficial in extending the lower detection limit of a CMOS APS pixel by enhancing the SNR under low illumination conditions. The upper detection limit 310 of the CMOS APS pixel can be bound by the saturation level (well capacity) of the photodetector (e.g., photodiode 206). Low background non-uniformity can be desirable across an image in order to prevent overwhelming low contrast features of interest. Therefore, it may be desirable to improve the performance of a digital imaging system, particularly in low illumination conditions, by increasing photodetector sensitivity, decreasing the pedestal noise level, and decreasing background non-uniformity.

Temporal noise can be caused by variations in a measured pixel voltage from frame to frame under constant uniform illumination. For example, imaging a stationary scene over the course of several frames should result in identical readout pixel voltages for a pixel from one frame to the next. However, the presence of temporal noise can introduce time-varying fluctuations in the readout voltage for a pixel, which under video rate imaging, for example, can be observed as random flickering in pixel intensity. An additional time-dependent artifact, known as image lag, can also be observed from frame to frame in an image under constant uniform illumination. Image lag can refer to the persistence of a residual signal from a previous frame which can be visible in the current frame. In the implementation of FIG. 2, temporal noise can be understood by investigating the sources of noise during three sequential phases of operation of a digital imaging system: reset, integration, and readout.

Two reset techniques can be used to reset a photodiode: a soft reset and a hard reset. These techniques can be based on the biasing conditions of the reset transistor (e.g., transistor 208). Reset noise can be the result of variations in the pixel reset voltage due to the application of a soft reset. The soft reset technique was described with reference to FIG. 2. In this technique, both the gate and the drain of the n-channel reset transistor (e.g., transistor 208) are held at $V_{DD}$ 230 during reset. Non-linearity and image lag can occur because the reset voltage at the photodiode can be dependent upon the previously integrated photodiode voltage as well as the length of the reset pulse during the reset phase.

For example, during a dark scene exposure the photodiode can be exposed to a small amount of light. Therefore, there may not be a significant amount of accumulated charge available at the photodiode. When a rolling shutter readout method is used, as described above, at the start of a soft reset the integrated photodiode voltage ($V_{pd}$) from the previous frame exposure may be greater than or equal to ($V_{DD}-V_{th}$), where $V_{th}$ can be the threshold voltage of the reset transistor (e.g., transistor 208) and $V_{DD}$ can be $V_{DD}$ 230. This can result in the reset transistor (e.g., transistor 208) operating in a sub-threshold or weak inversion mode. With the reset transistor operating in this mode, the photodiode voltage charges logarithmically from its starting point (the voltage representative of the previous dark scene exposure) due to the sub-threshold leakage current of the transistor 208. Under these conditions during a soft reset, the initial photodiode voltage ($V_{pd}(0)$) can be greater than or equal to the reset voltage value ($V_{DD}-V_{th}$). The photodiode voltage ($V_{pd}$) may have already reached or exceeded the reset voltage value ($V_{DD}-V_{th}$). Therefore, under these conditions, the integrated photodiode voltage ($V_{pd}$) can be based upon the accumulated charge provided by the subthreshold leakage current of the reset transistor (e.g., transistor 208). Therefore, the final photodiode reset voltage can depend upon two factors: the initial photodiode voltage prior to reset ($V_{pd}(0)$) (the voltage representative of the previous dark scene exposure), and the duration of the reset pulse (the amount of time the photodiode voltage can charge logarithmically from its starting point). This can result in image lag as the information from the previous frame will now be integrated into the next frame. If the next frame, for example, is also a dark scene exposure a progressive "staircase" incremental increase in reset voltage can occur from one frame to the next.

In another example, during a bright scene exposure the photodiode can be exposed to a large amount of light. This can result in a significant amount of accumulated charge available at the photodiode. For example, when a rolling shutter readout method is used, as described above, at the start of a soft reset the integrated photodiode voltage ($V_{pd}$) from the previous frame exposure may be less than ($V_{DD}-V_{th}$), where $V_{th}$ can be the threshold voltage of the reset transistor (e.g., transistor 208) and $V_{DD}$ can be $V_{DD}$ 230. This can result in the reset transistor (e.g., transistor 208) being saturated and operating in a linear or strong inversion mode. With the reset transistor operating in this mode, the photodiode voltage charges rapidly to ($V_{DD}$ 230-$V_{th}$) and then the reset transistor transitions to a weak inversion mode of operation for the duration of the reset pulse. In this example, the reset transistor (e.g., transistor 208) may spend the majority of the soft reset time period (the duration of the reset pulse) in this weak inversion mode. As a result, image lag can be suppressed in the next frame as the photodiode can begin charging from the reset voltage ($V_{DD}-V_{th}$).

An implementation of a hard reset technique may involve biasing the reset transistor (e.g., transistor 208) to operate in the linear or strong inversion mode. In one implementation, this can be done by setting the drain voltage to a voltage value less than $V_{DD}$. In another implementation, the gate voltage can be set to a value greater than $V_{DD}$. Putting the reset transistor into a linear mode of operation can allow the photodiode voltage to charge up to the value of the drain voltage.

The use of a hard reset technique can eliminate image lag. This is due to the steady-state equilibrium that can be achieved during the charging of the sense node to the drain voltage. In some implementations using a hard reset technique, the lowering of the drain voltage can reduce the well capacity of the reset transistor resulting in smaller depletion width. The smaller depletion width can limit the dynamic range of operation of the transistor. In other implementations of a hard reset technique, a PMOS transistor can be substituted for the NMOS reset transistor. This can result in a reduction in fill factor due to the larger area requirement with the PMOS n-well.

The noise power from a reset transistor (e.g., transistor 208) can be translated onto a sense node (e.g., node 234). Calculation of the noise power at the sense node output ($V^2_{sense}$), where a hard reset technique is used, can be expressed by the equation:

$$V^2_{sense} = \frac{kT}{C_{pd}}$$

where k is Boltzmann's constant, T is temperature in Kelvin, and $C_{pd}$ is the sense node capacitance, which includes the photodiode capacitance and associated parasitic sense node capacitances. Calculation of the noise power at $V^2_{sense}$, when a soft reset technique is used, can be expressed by the equation:

$$V^2_{sense} \approx \frac{1}{2}\frac{kT}{C_{pd}}$$

The use of a soft reset can reduce the noise power by approximately a factor of two from that of a hard reset. However, a hard reset can eliminate image lag.

In some implementations, a flushed reset can be an additional reset technique that combines a hard reset and a soft reset. The flushed reset can apply a hard reset pulse prior to a soft reset to clamp the photodiode's initial voltage to a fixed value, thereby suppressing image lag.

The charge integration phase can begin once reset is complete. Shot noise can be produced during this phase. Shot noise can refer to the fluctuation in the photodiode voltage due to the generation of electron-hole pairs within a depletion region. The charge integration phase can involve the charge accumulation of photo-induced charges, as well as dark charges by the photodiode. Dark charges can be charges that are produced in the photodiode in the absence of any incident light on the device. Dark charges can be caused by several mechanisms which can include thermal generation in the depletion region due to injection-diffusion, and generation-recombination. Presence of impurities, metal contamination, material defects, and interface defects can lead to the formation of intermediate energy levels in the silicon bandgap which can also lead to an increase in thermal generation. The accumulation of dark charges can result in a dark current, which can take the form of a leakage current. The generated dark charges from the dark current can be accumulated over the integration phase and can then be measured during the sampling phase. These dark charges can contribute to shot noise, and can be referred to as dark current shot noise.

Photon shot noise can occur due to the random discrete nature of incoming photons when a photodiode is under uniform illumination. Therefore, total shot noise during the integration process can include dark current shot noise and photon shot noise. For example, dark current shot noise can be the main contributor to shot noise in a dark scene exposure. Alternatively, photon shot noise can be the main contributor to shot noise in a bright scene exposure.

Readout of the photodiode voltage can be performed during the sampling phase. Noise in this phase can be thermal noise contributed by the source follower transistor (e.g., transistor 210), the row select transistor (e.g., transistor 212), and the column load transistor (e.g., transistor 214). In some implementations of the digital imaging system of FIG. 2, the noise during this phase can be of lesser magnitude that that of the noise during the reset phase.

Another type of noise present in a digital imaging system can be spatial noise or fixed pattern noise (FPN). Spatial FPN can refer to variations in pixel voltages across a frame. Spatial non-uniformities can occur due to the charge to voltage conversion performed at the pixel level. These non-uniformities can also occur due to mismatches in conversion gain, and discrepancies in pixel circuitry, and in the highly structured readout architecture included in the column circuitry. Therefore, fixed pattern noise can include contributions from the pixel circuitry (e.g., pixel circuit 202), and the column circuitry (e.g., column circuit 204), which can be referred to as pixel level FPN and column level FPN, respectively. Fixed pattern noise can occur due to variations in pixel offset and gain across an imager under a uniformly illuminated scene, and is constant from frame to frame. Under low illumination, pixel level FPN can be visible in a frame as a fixed speckled pattern, and column level FPN can be visible in a frame as a fixed vertical line pattern.

Pixel level FPN can be characterized as random spatial variations from pixel to pixel in a digital imaging system. It can be caused by inter-pixel mismatches in pixel circuitry and photodetector properties. One contributor to pixel level FPN, pixel level offset FPN, can occur due to factors such as charge injection and threshold variations from the reset transistor (e.g., transistor 208), capacitive coupling, and threshold variations in the source follower transistor (e.g., transistor 210). Pixel level offset FPN can be eliminated with the use of double sampling techniques such as correlated double sampling (CDS). In some implementations, a correlated double sampling technique, as described with reference to FIG. 2, can involve sampling the photodiode output twice: once during the reset phase and once during the sampling phase. The value obtained during the reset phase is subtracted from the value taken during the sampling phase. This can allow for the removal of pixel level offset FPN. The ability to perform CDS for pixel level offset FPN, however, can require the use of two transistors (e.g., transistors 216, 218) and two capacitors (capacitors 220, 222) in the column circuitry (e.g., column circuit 204).

Another contributor to pixel level FPN, pixel level gain FPN, can be related to variations in photodetector properties (e.g., photodiode shape, photodiode area, doping concentrations, and photodiode capacitance). The non-uniformity that can be associated with the use of a source follower amplifier (e.g., transistor 210) can also add to pixel level gain FPN. These variations and non-uniformities can be referred to as pixel response non-uniformity (PRNU). Therefore, pixel level gain FPN may depend upon the accuracy of the semiconductor fabrication process used to produce the digital imaging system. Pixel level gain FPN can be difficult to correct due to its non-linearity.

In some implementations, CDS may also be used to remove reset noise. In this implementation, the reset voltage of the photodiode can be stored in a storage capacitor that can be added to a pixel circuit, coupled to the photodiode. The reset voltage of the photodiode for the current pixel sample can be stored in the capacitor and later used, during readout, to compensate for reset noise for that pixel sample.

In some implementations, defects present at a photodiode junction interface, material contaminations, and flaws in the substrate related to the fabrication process can lead to defect-related dark current. This dark current can contribute to pixel level spatial non-uniformity. The non-uniformity caused by the defect-related dark current can be referred to as dark signal non-uniformity (DSNU). DSNU can be visible in a frame as random bright spots.

Column level FPN can be characterized as random spatial variations from column to column in a digital imaging system. It can be caused by column to column mismatches in column circuitry. One contributor to column level FPN, column level offset FPN, can be caused by variations in the bias current provided by the source follower load transistor (e.g., transistor 214), which services all pixel source followers within a column. Other sources of column level offset FPN can include variations in sample-and-hold pass transistor (e.g., transistors 216, 218) charge injection, column sampling capacitors (e.g., capacitors 220,222), and column-level source follower threshold variations. Another contributor to column level FPN, column level gain FPN, can be caused by the non-uniformity associated with the use of a source follower transistor for readout. Column level gain FPN can be less noticeable in a frame at the column level, due to the larger transistor dimensions used at the column level, which can contribute to suppressing mismatches.

At comparable levels, column level FPN can be more noticeable in a frame than pixel level FPN due to its distinct patterned nature in a frame (vertical streaks or lines). Column level offset FPN can be cancelled with the use of correlated double sampling. CDS can be performed if the reset phase and the sampling phase use the same circuitry to acquire the sampled reset voltage, and the sampled signal voltage, respectively.

Referring to FIG. 3, temporal noise can contribute to the noise floor 308. The level of the noise floor 302 can determine the minimum resolvable photodiode signal for a pixel. A reduction of the noise floor 308 (lowering the noise floor level) can result in increased low-light resolution in a digital imaging system. In some implementations, temporal noise, in the form of reset noise, can be reduced by using negative feedback techniques.

Spatial FPN can be a fixed amount of noise and may not vary from frame to frame. It can be desirable to reduce spatial FPN in order to reduce background non-uniformity. In some implementations, read noise along the readout path can be minimized by using low-noise amplifiers. In some implementations, pixel level and column level FPN can be suppressed by using amplifier topologies with accurate gain matching and offset compensation.

Figure 4:
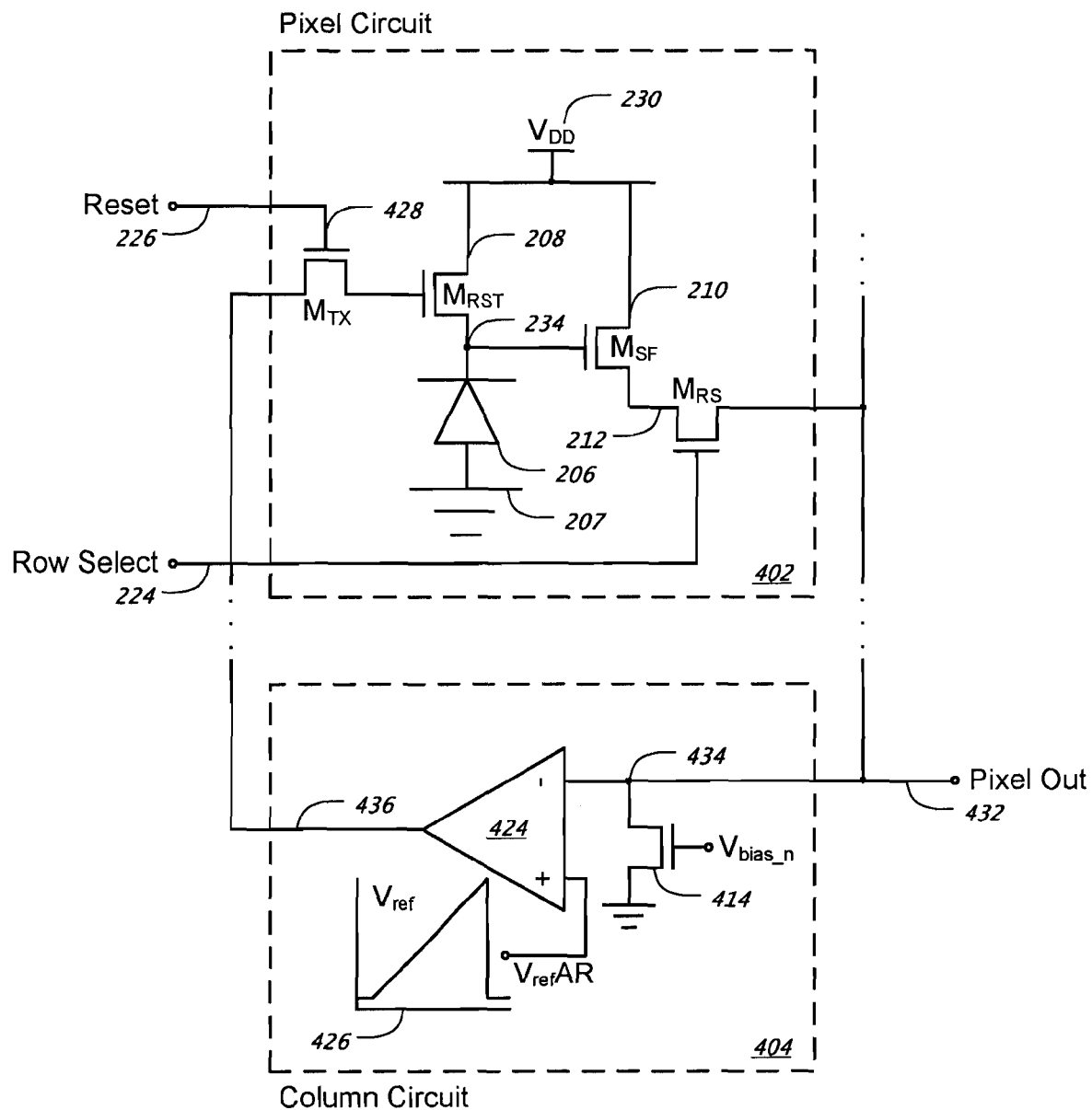
FIG. 4 is a diagram of an active reset technique, according to one implementation.

FIG. 4 is a diagram of an active reset technique that can be used in a digital imaging system, according to one implementation. FIG. 4 includes pixel circuit 402, which includes pixel circuit 202 and additional transistor 428 ($M_{TX}$), and column circuit 404, which can be included with the column circuit 204. The pixel output 432 of column circuit 404 can be coupled to the pixel input 252 of column circuit 204.

The circuit of FIG. 4 includes a high gain column amplifier 424 in a negative feedback configuration, which can suppress photodiode reset noise by accurately controlling the reset current delivered by the reset transistor 208. The node of photodiode 206 can be reset according to a reference waveform 426 ($V_{ref}AR$).

The rolling shutter readout method of operation, as described above, can be used in the implementation of the active reset technique of FIG. 4. Using this readout method, the column amplifier 424 can be used with every pixel within a column during its respective row access period. An additional pass transistor 428 can be used to connect the gate of the reset transistor 208 to the feedback loop of the column amplifier 424 during the active reset of the specific pixel.

A row of pixels can be accessed during the sample phase. Row Select 224 and sample and hold signal 228 (SHS) can be raised in order for the integrated voltage on photodiode 206 to be sampled onto the column sample and hold capacitor 220. The same row of pixels can then be accessed during a reset phase. The digital imaging system can be used in a "read-first reset-later" sampling sequence, which was described above.

The reset phase can be initiated by asserting Reset 226, followed by activation of the reference waveform 426. A gradually increasing reference waveform can be used to modulate the unidirectional drain current of the reset transistor 208, which flows from the drain to the source, in order to charge the photodiode 206. In the implementation of FIG. 4, the reference waveform 426 is a ramp pulse. In other implementations, the reference waveform may be an RC pulse with a smaller time constant than the time constant of the photodiode sense node. As the reference voltage 426 increases, instantaneous noise fluctuations at the photodiode sense node 234 can be sensed by negative amplifier terminal 434 and reduced by the opposing, amplified, modulation of the drain current of the reset transistor 208. Before the end of the reset pulse during the reset phase, the ramp voltage of the reference voltage 426 drops. This can cause the column amplifier output 436 voltage to fall to a lower ground rail. This can switch off the reset transistor 208, thereby latching the peak sampled photodiode voltage on the photodiode sense node 234. Reset 226 can be lowered ending the reset pulse, and terminating the reset phase. The row access period for the reset phase can be concluded by sampling the reset voltage onto the column sample and hold reset capacitor 222 for subsequent readout.

The active reset technique can be used to suppress reset noise. In the implementation of FIG. 4, two feedback mechanisms can accomplish this. One feedback mechanism can be the amplification of the gate-to-source feedback capacitance of the reset transistor 208 by the Miller effect. Another feedback mechanism can be the modulation of the reset current via the transconductance of the reset transistor based on the sensed photodiode voltage.

Figure 5:
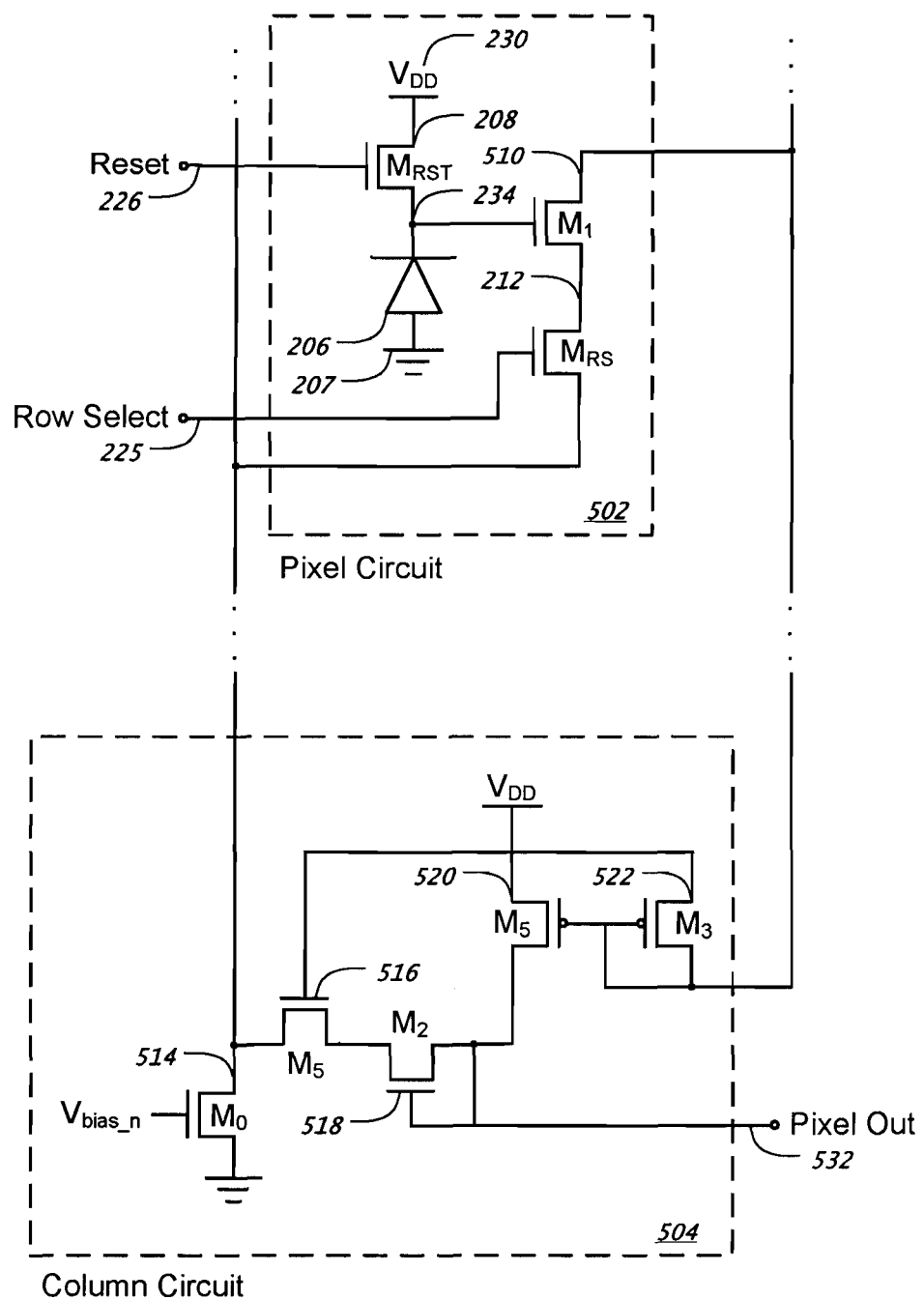
FIG. 5 is a diagram of an active column sensor readout technique, according to one implementation.

FIG. 5 is a diagram of an active column sensor readout circuit that can be used in a digital imaging system, according to one implementation. FIG. 5 includes pixel circuit 502, and column circuit 504, which can be included with the column circuit 204. The pixel output 532 of column circuit 504 can be coupled to the pixel input 252 of column circuit 204.

The implementation of the active column sensor readout circuit of FIG. 5 can include a high gain differential amplifier in a unity gain configuration, which can suppress column level offset FPN, and column level gain FPN. The source follower transistor (e.g., transistor 210) can be replaced with a high gain differential amplifier in unity gain configuration, where the differential amplifier is partitioned between the pixel circuit 502 and the column circuit 504. The partitioning of the amplifier and the substitution of the source follower transistor can maintain the high fill factor (ratio of photosensitive area to the total pixel area) of the pixel.

In the implementation of FIG. 5, unity gain readout can be performed and fill factor can be maintained by partitioning a portion of the differential amplifier circuitry in the pixel circuit (e.g., transistor 510 and transistor 212) while the remaining circuitry can be included in column circuit 504. The row select transistor 212 can allow the differential pair transistor 510 to be selectively connected to or disconnected from the remaining amplifier circuitry in column circuit 504. The column circuit 504 along with column circuit 204 can be used by all pixels within the column.

The differential amplifier in the implementation of FIG. 5 can be a simple differential amplifier. In some implementations, more advanced, multistage amplifiers can be used. In these implementations, the majority of the circuitry can be included in the column circuit, maintaining the high fill factor of the pixel.

In the implementation of FIG. 5, transistors 510 and 518 can form an input differential pair, transistors 520 and 522 can form an active current load, and transistor 514 can form the differential pair current source. Transistor 516 can be included to match transistor 212. This can maintain symmetry in the differential pair branches. Transistor 516 can be biased to $V_{DD}$ 530.

In the implementation of FIG. 5, pixel level gain FPN during a sampling phase can be reduced by the high open-loop gain of the partitioned differential amplifier. As a result, input dependent gain variations and process dependent gain variations that can be associated with the use of a source follower amplifier (e.g., transistor 210) can be suppressed. This can reduce the pixel response non-uniformity (PRNU). Threshold voltage level shifting and signal swing reduction (less than unity gain) associated with a source follower amplifier (e.g., transistor 210) can also be eliminated by the high open-loop gain of the partitioned differential amplifier.

The use of an active column sensor readout technique can result in a reduction in pixel level gain FPN. However, offset level FPN may also be present as spatial noise in the output pixel signal. In some implementations, the use of double sampling techniques such as correlated double sampling (CDS), as described with reference to FIG. 2, may be used to suppress the spatial noise level at the output pixel signal.

In some implementations, including an active column sensor readout circuit in a digital imaging system may not require modification to the pixel level circuitry. This can allow for the same degree of flexibility in a digital imaging system, such as random access, low power, electronic shuttering, and non-destructive readout.

In some implementations, low noise operation of a digital imaging system can be achieved by the combined use of the active reset technique, described with reference to in FIG. 4, and the active column sensor readout technique, described with reference to FIG. 5. Circuit similarities can be found in the two techniques. A high gain amplifier can be used in both techniques, which can be implemented either partially or completely within the column circuit. Also in both techniques, the photodiode sense node (e.g., node 234) can be either directly coupled, as shown in FIG. 5, or indirectly coupled via the source follower transistor (e.g., transistor 210) to an amplifier terminal, as shown in FIG. 4.

Therefore, in some implementations, a single partitioned amplifier can be used to accommodate the active reset technique and the active column sensor readout technique.

Figure 6:
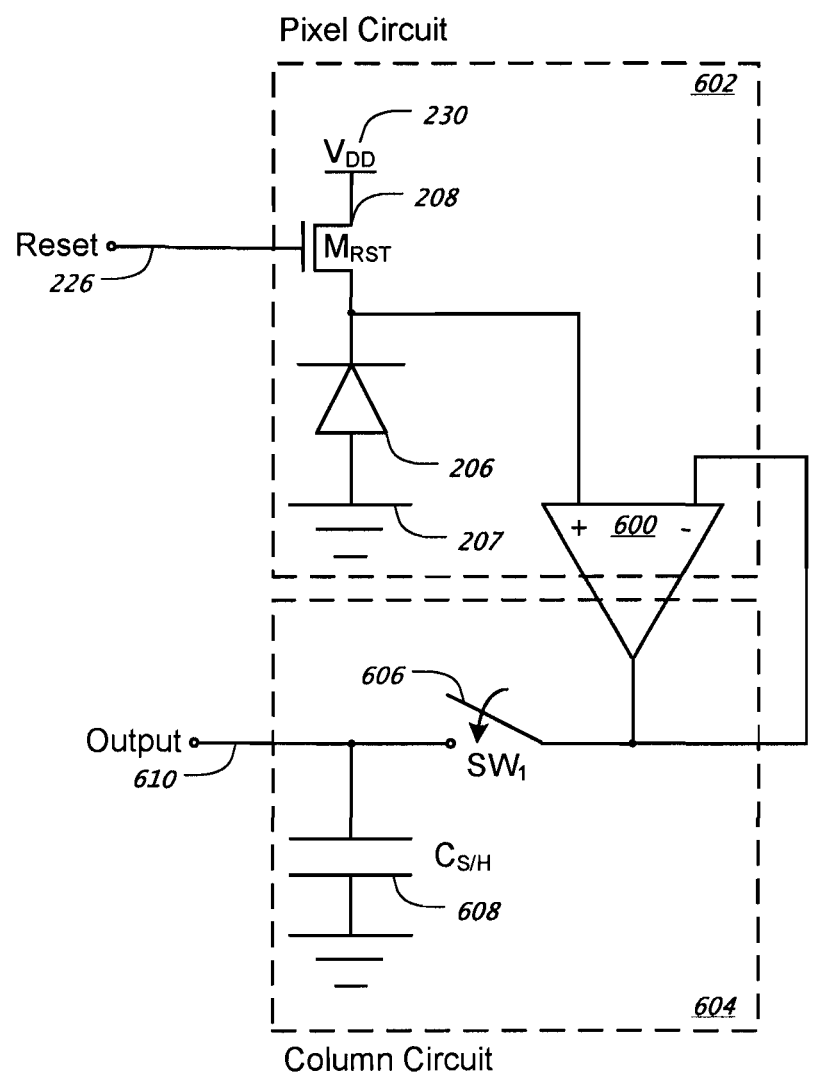
FIG. 6 is a diagram of a partitioning of a high gain amplifier between a pixel circuit and a column circuit, according to an implementation of an active column sensor technique.

FIG. 6 is a diagram of a partitioning of a high gain amplifier 600 between a pixel circuit 602 and a column circuit 604, according to an implementation of an active column sensor technique. In the implementation of FIG. 6, the pixel circuit 602 can be implemented in a similar manner as pixel circuit 502 (FIG. 5). The column circuit 604 can be implemented in a similar manner as column circuit 504 (FIG. 5). The column circuit 604 can also include switch 606 and capacitor 608. In the implementation of FIG. 6, the high gain amplifier 600 can include transistors 510, 212 in the portion of the amplifier 600 located in the pixel circuit 602. Amplifier 600 can also include transistors 514, 516, 518, 520, and 522 in the portion of the amplifier 600 located in the column circuit 506.

Capacitor 608 can be used as a sample and hold capacitor during the sampling phase. Switch 606 can be closed during the sampling phase to allow for the charging of capacitor 606. Output 610 can represent the photodiode voltage level during sampling. Output 610 can be input to further column processing circuits (e.g. 108) or to the chip circuit (e.g., chip circuit 234. During the reset phase, switch 606 can be opened, and no charge will accumulate in capacitor 608.

Figure 7:
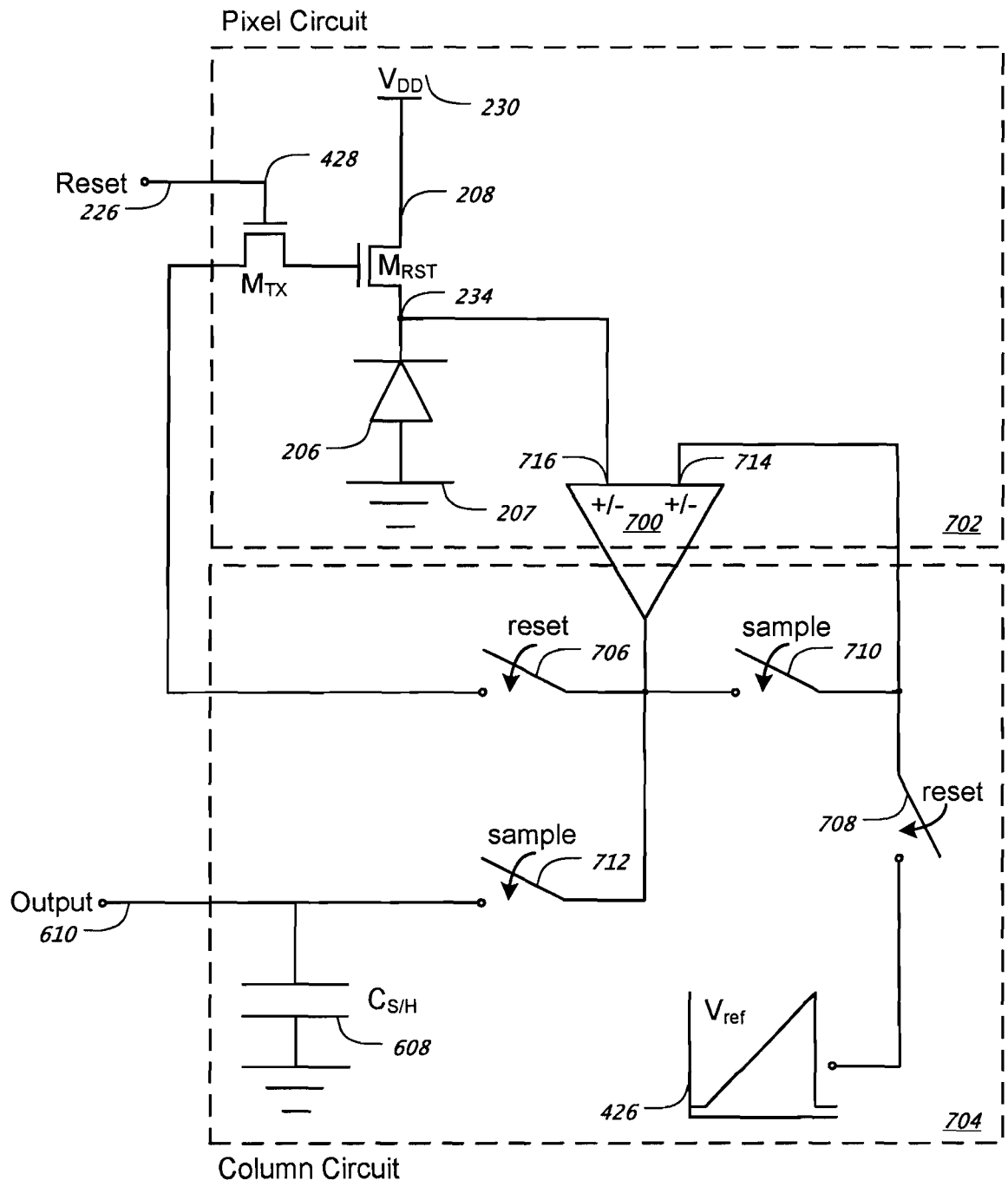
FIG. 7 is a diagram of a single partitioned amplifier that can be used with an active reset technique combined with an active column sensor readout technique, according to one implementation.

FIG. 7 is a diagram of a single partitioned amplifier 700 that can be used with an active reset technique combined with an active column sensor readout technique, according to one implementation. In the implementation of FIG. 7, the partitioned amplifier topology used for the active column sensor readout technique, shown in FIGS. 5 and 6, can be used to implement the active reset technique, shown in FIG. 4.

In some implementations, a rolling shutter readout method can be used to configure the topology of the common amplifier into two alternate modes of operation. One mode of operation can be the use of the active reset technique during the reset phase. This can occur when a reset signal (e.g., Reset 226) is asserted and can be referred to as the active reset mode. The reset signal can also control the operation of switches 706 and 708. Another mode of operation can be the use of the active column sensor readout technique during the sampling phase. This can occur when a sample signal is asserted and can be referred to as the unity gain sampling mode. The sampling signal can also control the operation of switches 710 and 712.

In some implementations, the reset phase and the sampling phase can occur at different points in time during a row access period. The implementation of FIG. 7 can represent an efficient reuse of circuitry by using a single, configurable, partitioned amplifier 700. The amplifier 700 can implement the active reset technique as well as the active column sensor readout technique. Therefore, circuitry for both techniques can be shared allowing for circuit component reduction and simplification.

In the implementation of FIG. 7, the polarity of input amplifier terminals 714, 716 of amplifier 700 can change polarity to account for the alternating amplifier polarity coupled to the photodiode sense node (e.g., node 234) during the application of the active reset mode and the unity gain sampling mode. During the active reset mode of operation, terminal 714 can be the positive terminal and terminal 716 can be the negative terminal. Switches 706, 708 are closed while switches 710, 712 are open. Therefore, reference voltage 426 can be coupled to the positive terminal 714, and the photodiode sense node 234 can be coupled to the negative terminal 716, providing the feedback needed for the reset operation. Alternatively, during the unity gain sampling mode of operation, terminal 714 can be the negative terminal and terminal 716 can be the positive terminal. Switches 706, 708 are open while switches 710, 712 are closed. Therefore, the amplifier 700 can be configured with unity gain feedback, and the accumulated photodiode voltage can be sampled onto capacitor 608. During the unity gain sampling mode of operation, the feedback needed for the reset operation can be disabled, thereby reverting to a lower effective capacitance dominated by the photodiode capacitance, permitting a high charge-to-voltage gain/sensitivity (i.e., higher conversion gain) for readout.

In the implementation of FIG. 7 in the active reset mode of operation, the photodiode sense node 234 can be directly coupled to the amplifier 700 input terminal 716. In the implementation of FIG. 5, transistor 210, acting as a source follower amplifier, was used to sense the photodiode voltage. The use of transistor 210 can prevent the direct measurement of the instantaneous, photodiode sense node voltage for comparison against the reference voltage 426 applied at the positive input terminal 714 of amplifier 700. In other implementations of the active reset technique, the photodiode sense node can be directly coupled to an amplifier input, provided the entire the amplifier is included in the pixel circuit. This can reduce the pixel fill factor.

In some implementations of FIG. 7, the use of correlated double sampling (CDS), as described with reference to FIG. 2, may also be used to suppress the noise level at the output pixel signal. In some implementations of FIG. 7, amplifier 700 can be implemented as a single-stage, differential-input, single-output, amplifier with an active current mirror.

Figure 8:
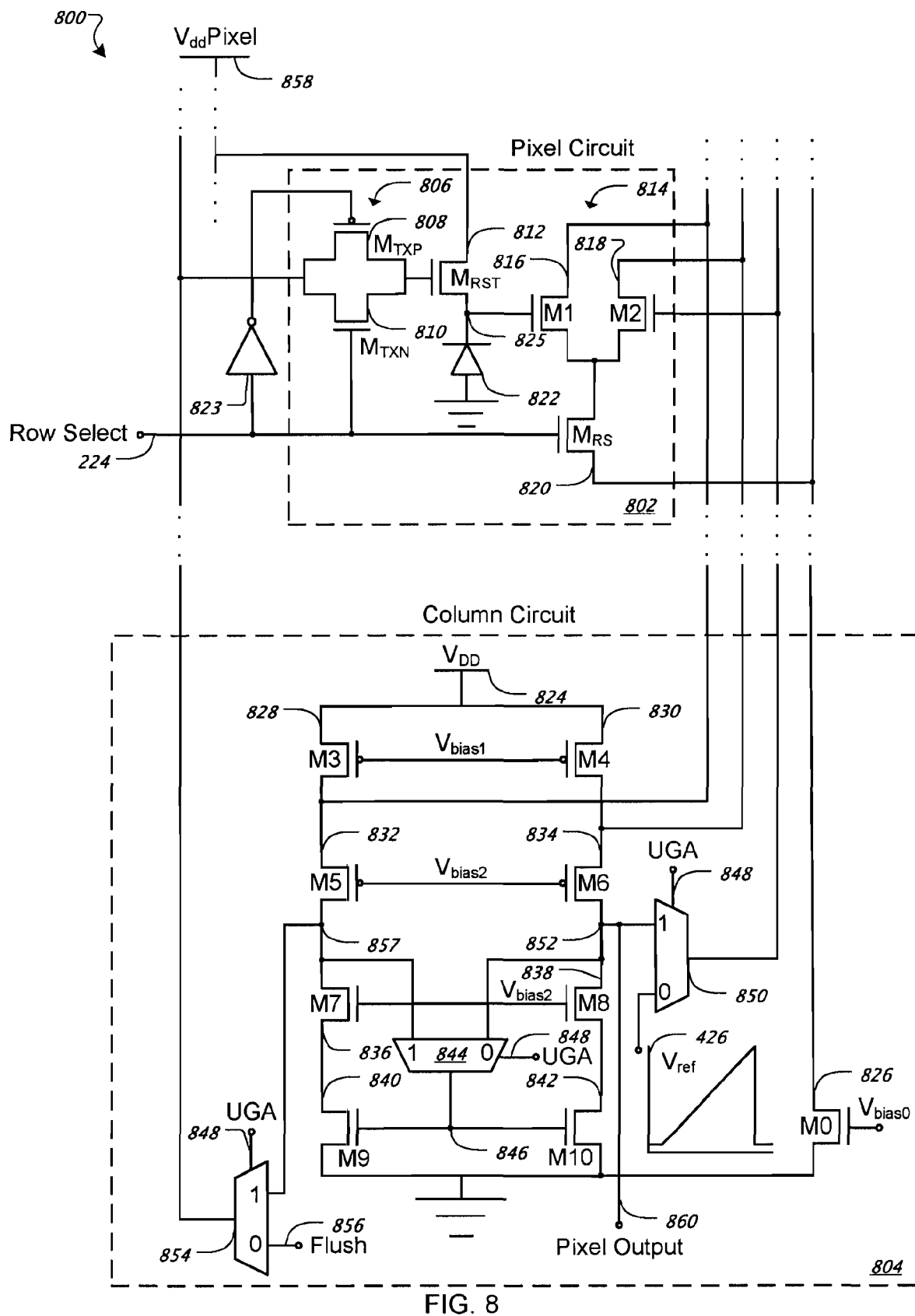
FIG. 8 is a schematic diagram of a circuit that combines an active reset technique with an active column sensor readout technique, according to one implementation.

FIG. 8 is a schematic diagram of a circuit 800 that combines an active reset technique with an active column sensor readout technique, according to one implementation. The implementation of FIG. 8 can be used as a circuit for the implementation of FIG. 7. The implementation of FIG. 8 shows a single pixel and its associated column circuitry. The circuit 800 includes pixel circuit 802 and column circuit 804. The pixel circuit 802 includes a transmission gate 806 (transistor 808 ($M_{TXP}$) and transistor 808 ($M_{TXN}$)), reset transistor 812 ($M_{RST}$), differential pair 814 (transistors 816 (M1) and transistor 818 (M2)), a row select transistor 820 ($M_{RS}$), and photodiode 822. The inverter 823 can be included in row select logic (e.g., row select logic 104). The inverter 823 can be used to provide the needed polarity of the Row Select signal 224 to the gate of transistor 808.

In the implementation of an active reset technique in FIG. 4, transistor 428 can be coupled to the input of reset transistor 212. In this implementation, the maximum pixel reset voltage can be limited to two threshold voltage levels (the threshold voltage across transistor 428 and the threshold voltage across transistor 212) below the supply voltage (e.g., $V_{DD}$ 230). In the implementation of FIG. 8, transmission gate 806 can be coupled to the input of the reset transistor 820. The substitution of the transmission gate 806 for the transistor 428 can maximize the pixel reset voltage to a single threshold voltage level (the threshold voltage across reset transistor 812) below the supply voltage (e.g., $V_{DD}$ 858). Maximizing the pixel reset voltage can allow for an extension of the upper swing in feedback voltage during an active reset mode. This can raise the photodiode reset voltage level by a threshold voltage to allow for a higher saturation level and well capacity. The implementation of the transmission gate 806 in FIG. 8 can be used in advanced CMOS technologies where the use of a low supply voltage can limit the possible dynamic range of the feedback voltage. Transistors 808, 810 can be sized appropriately to reduce resistance in the "on" state, and to allow for charge injection cancellation from the complementary charge packets inherent to both channels. Switching the transmission gate to the "on" state can result in the injection of electron charges by the NMOS device, which can be cancelled by an equivalent injection of hole charges by the PMOS device.

In the implementation of FIG. 8, the amplifier (e.g., amplifier 700) can be partitioned with the full differential pair, transistors 816, 818, implemented in the pixel circuit 802. This implementation can result in a symmetric partitioning of the amplifier, as well as the ability, in the semiconductor fabrication process, for the layout of transistors 816, 818 to be in close proximity to one another using techniques such as common-centroid layout. The use of the symmetric partitioning can reduce offsets that may be due to transistor matching errors.

The addition of transistors 808, 810, 816, 818 to the pixel circuit 802 can reduce the pixel fill factor as well as necessitate the use of additional feedback lines from the column circuit 804 to the pixel circuit 802. However, with the use of an advanced CMOS process, the reduction in pixel fill factor can be marginal as compared to the pixel fill factor for a 3T CMOS APS imager, for example.

In some implementations, the amplifier 700 can be a folded cascode amplifier. A folded cascode amplifier can produce a large open loop gain for a single gain stage. The amplifier 700 can be included partly in pixel circuit 802 and partly in column circuit 804. For example, the input differential pair current source (transistor 826 (M0)), and folded cascode branch (transistors 828, 830, 832, 834, 836, 838, 840, 842 (M3-M10, respectively)) can be implemented in column circuit 804 and shared amongst all pixels within a column, of which pixel circuit 802 can be one example.

In the implementation of FIG. 8, a control signal 848 (UGA) along with multiplexers 844, 850, 854 can be used to configure the amplifier for its two modes of operation: the active reset mode or the unity gain sampling mode. The control signal 848 can be set equal to logic "0" when the amplifier is set to the active reset mode of operation. The control signal 848 can be set equal to logic "1" when the amplifier is set to the unity gain sampling mode of operation. The control signal 848 can be used in place of a reset signal (e.g., Reset 226). Pixel out 860 can be coupled to pixel in 252 (FIG. 2).

As described with reference to FIG. 7, the amplifier input terminal polarities can be toggled/swapped dependent upon the mode of operation. In the implementation of FIG. 8, multiplexer 844 can be used to perform a reconfiguration of the orientation of the current mirror formed by transistors 836, 838, 840, 842. Control signal 848 (UGA) can be used to control the configuration of multiplexer 844. Common gate node 846 of transistors 840 and 842 can be coupled to the drain of transistor 836 during the unity gain sampling mode of operation. Alternatively, the common gate node 846 of transistors 840 and 842 can be coupled to the drain of transistor 838 during the active reset mode of operation. The multiplexing of the node 846 can define which cascode branch of the amplifier can serve as the input reference to the current mirror and which cascode branch of the amplifier can serve as the amplifier output.

In the implementation of FIG. 8, control signal 848 (UGA) can also be used to control the configuration of multiplexer 850. Multiplexer 850 can be used to bridge connections for unity gain feedback during the unity gain sampling mode of operation by coupling node 852 to the gate of transistor 818. The multiplexer 850 can also be used to couple the reference voltage 426 to the gate of transistor 818 during the active reset mode of operation.

In the implementation of FIG. 8, control signal 848 (UGA) can also be used to control the configuration of multiplexer 854. Multiplexer 854 can be used to establish the feedback loop during the active reset mode of operation by coupling node 857 to transmission gate 806. The multiplexer 854 can also be used to couple a hard reset pulse at flush 856 to transmission gate 806. The hard reset pulse can be applied prior to the active reset mode in a hard reset technique. In an implementation of a hard reset technique, the gate of the reset transistor 812 can be raised to $V_{DD}$ 824, while its drain (which is coupled to $V_{dd}$Pixel) can be lowered below ($V_{DD}$ 858–$V_{th}$), where $V_{th}$ is the threshold voltage of transistor 812. The implementation of the hard reset technique can be similar to the flushed reset, as described above. In the implementation of FIG. 8, the hard reset technique can be used with the active reset mode of operation of the amplifier to suppress image lag.

Figure 9:
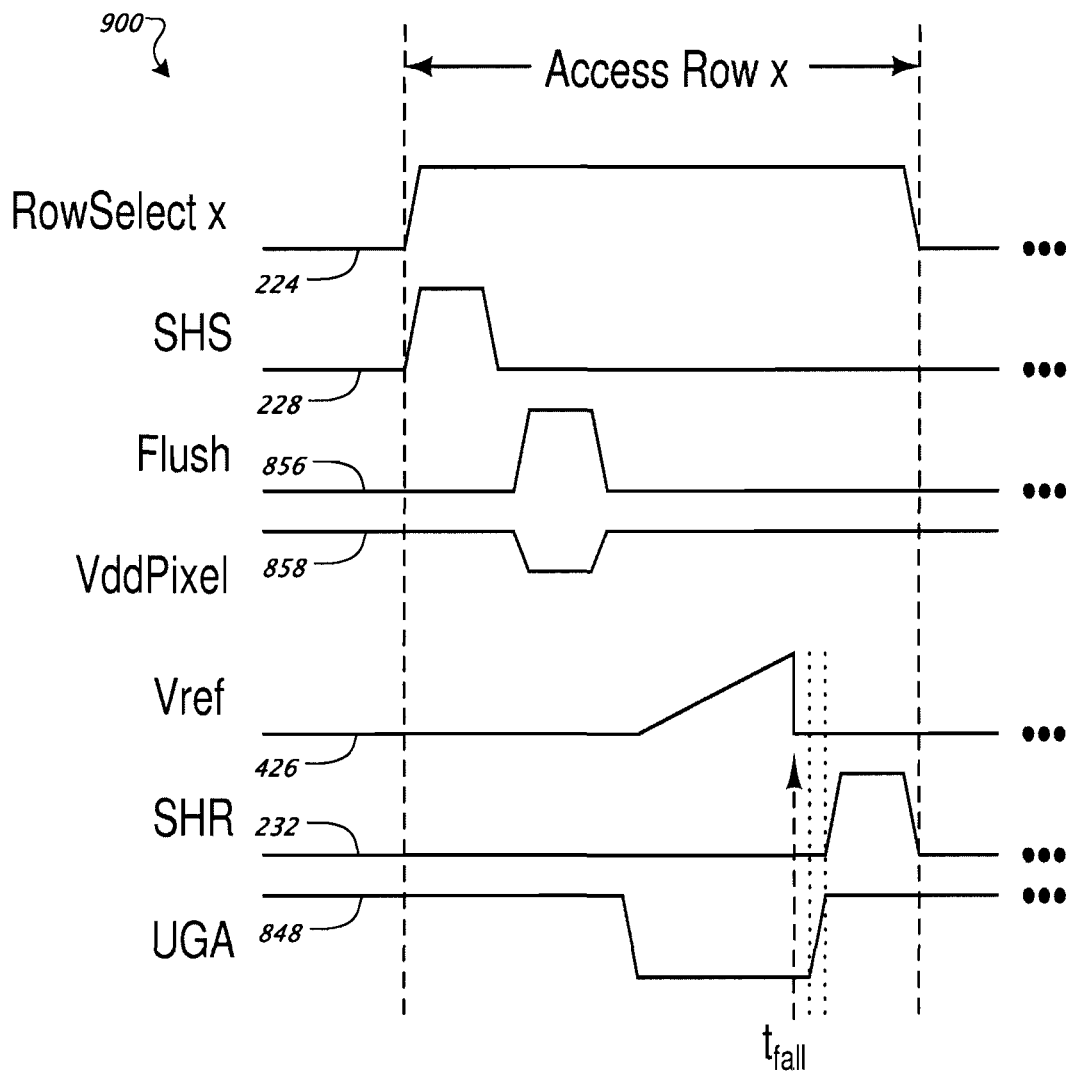
FIG. 9 is a diagram of control waveforms, according to one implementation.

FIG. 9 is a diagram of control waveforms 900, according to one implementation. The waveforms 900 depict the row access period of a single row of pixels that can be included in a digital imaging system.

The following example refers to the circuit 800 of FIG. 8. For example, in the case of row x, the row access period can begin by activating the Row Select signal 224, which can selectively couple the differential pair 814 to the column circuit 804 via multiplexer 850. Control signal 848 (UGA) is equal to logic "1", configuring the amplifier in the unity gain sampling mode of operation. In this mode of operation, multiplexer 844 can configure the amplifier input terminals to the polarity used in the unity gain sampling mode of operation, as was described with reference to FIG. 8. Photodiode sense node 825 can be coupled to the positive input terminal of the amplifier and the output of the amplifier can be coupled to the negative input terminal.

The integrated photodiode voltage can be sampled by activating sample and hold signal 228 (SHS), as was described with reference to FIG. 2. Following the sampling of the photodiode voltage, a hard reset pulse at flush 856 can be optionally applied to the pixel which uses $V_{dd}$Pixel 858, as was described in FIG. 8. The implementation of a hard reset technique can eliminate image lag, and can insure that the initial photodiode voltage prior to the initiation of the active reset mode of operation is at a constant value. Next, control signal 848 (UGA) is equal to logic "0", configuring the amplifier in the active reset mode of operation. In this mode of operation, multiplexer 844 can configure the amplifier input terminals to the polarity used in the active reset mode of operation, as was described with reference to FIG. 8. The photodiode sense node 825 can be coupled to the negative input terminal of the amplifier, and the output of the amplifier can be coupled to the gate of the reset transistor 812, via multiplexer 854 and the transmission gate 806. Also in this mode, the reference voltage 426 ($V_{ref}$) can be applied to the positive input terminal of the amplifier.

Following the completion of the active reset mode, control signal 848 (UGA) is again equal to logic "1", configuring the amplifier in the unity gain sampling mode of operation. In this mode of operation, the sample and hold signal 232 (SHR) can be activated, allowing the reset voltage to be sampled. The Row Select signal 224 can then be deactivated (lowered), and the sampled voltages for the column can be read out, using techniques previously described. Control signal 848 (UGA) can remain equal to logic "1" in preparation for the sampling of the integrated photodiode voltages of the next row (e.g., row x+1).

Figure 10:
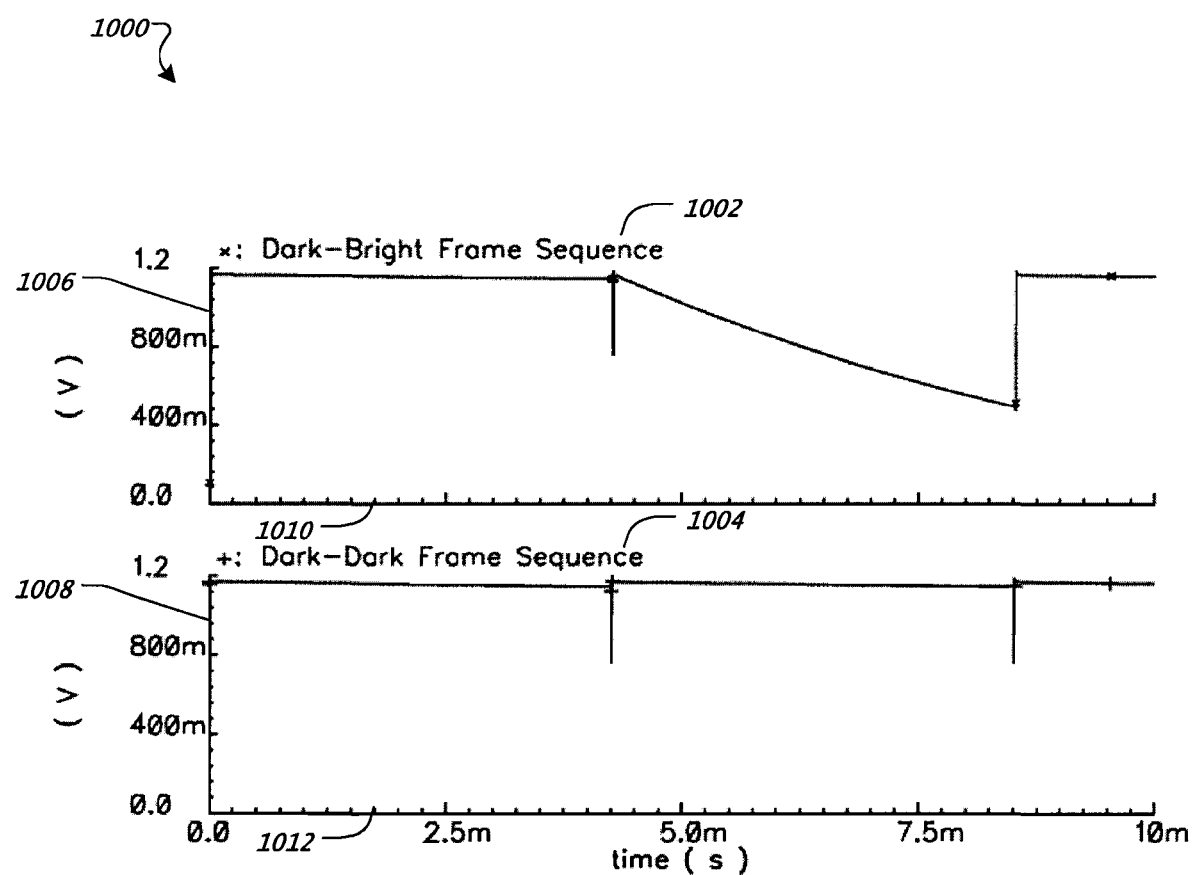
FIG. 10 shows simulated plots of waveforms for a dark-bright frame sequence and dark-dark frame sequence captured by a digital imaging system.

FIG. 10 shows simulated plots of waveforms 1000 for a dark-bright frame sequence 1002 and dark-dark frame sequence 1004 captured by a digital imaging system. The waveforms 1000 can be generated by a digital imaging system that can include the circuit 800 of FIG. 8. A pixel of digital imaging system can be subjected to alternating high and low illumination levels for the dark-bright frame sequence 1002. Alternatively, a pixel of a digital imaging system can be subjected to alternating low illumination levels for both frames in the dark-dark frame sequence 1004. The photodiode sense node voltage value (e.g., node 825) is plotted against time. Voltage value (in millivolts) is plotted along y axis 1006, 1008 for sequences 1002, 1004, respectively. Time (in seconds) is plotted along x axis 1010, 1012 for sequences 1002, 1004, respectively. As was described with reference to FIGS. 8 and 9, a hard reset pulse at flush 856 can be applied to the photodiode sense node prior to the execution of the active reset mode to reduce image lag. The waveforms 1000 show that the reset voltage in both illumination conditions can be constant and independent of the previously integrated photodiode voltage.

Figure 11:
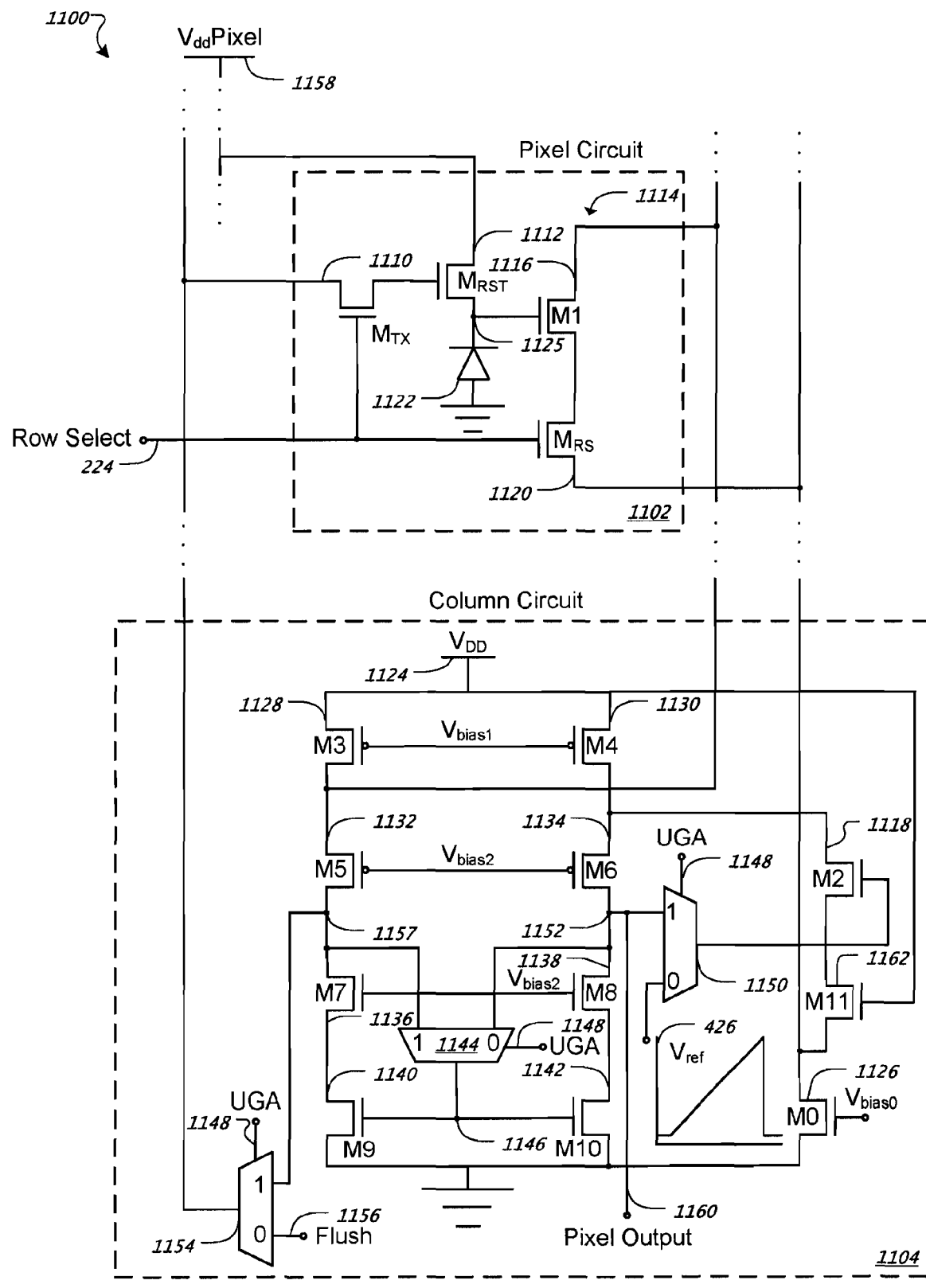
FIG. 11 is a schematic diagram of a circuit that combines an active reset technique with an active column sensor readout technique, according to an alternate implementation.

FIG. 11 is a schematic diagram of a circuit 1100 that combines an active reset technique with an active column sensor readout technique, according to one implementation. The implementation of FIG. 11 can be used as a circuit for the implementation of FIG. 7. The implementation of FIG. 11 shows a single pixel and its associated column circuitry. The circuit 1100 includes pixel circuit 1102 and column circuit 1104. The pixel circuit 1102 includes transistor 1110 ($M_{TX}$), reset transistor 1112 ($M_{RST}$), a row select transistor 1120 ($M_{RS}$), and photodiode 822.

In the implementation of FIG. 11, the amplifier (e.g., amplifier 700) can be partitioned with a full differential pair of transistors where one transistor, transistor 1116 (M1), can be located in the pixel circuit 1102 and the other transistor, transistor 1118 (M2), can be located in the column circuit 1104. The addition of transistor 1118 to the column circuit 1104 can increase the pixel fill factor as well as eliminate the use of additional feedback lines from the column circuit 1104 to the pixel circuit 1102, as compared to circuit 800. Circuit 1110 may introduce more offsets due to a mismatch in the amplifier differential pair transistors, as they are not laid out in close proximity (transistor 1116 is in the pixel circuit 1102 and transistor 1118 is in the column circuit 1104).

Transistor 1110 can be coupled to the input of reset transistor 1112. The maximum pixel reset voltage can then be limited to two threshold voltage levels (the threshold voltage across transistor 1110 and the threshold voltage across transistor 1112) below the supply voltage (e.g., $V_{DD}$1158).

In some implementations of FIG. 11, the amplifier 700 can be a folded cascode amplifier. A folded cascode amplifier can produce a large open loop gain for a single gain stage. The amplifier 1100 can be included partly in pixel circuit 1102 and partly in column circuit 1104. For example, the input differential pair current source (transistor 1126 (M0)), and folded cascode branch (transistors 1128, 1130, 1132, 1134, 1136, 1138, 1140, 1142 (M3-M10, respectively)) can be implemented in column circuit 1104 and shared amongst all pixels within a column, of which pixel circuit 1102 can be one example.

In the implementation of FIG. 11, a control signal 1148 (UGA) along with multiplexers 1144, 1150, 1154 can be used to configure the amplifier for its two modes of operation: the active reset mode or the unity gain sampling mode. The control signal 1148 can be set equal to logic "0" when the amplifier is set to the active reset mode of operation. The control signal 1148 can be set equal to logic "1" when the amplifier is set to the unity gain sampling mode of operation. The control signal 1148 can be used in place of a reset signal (e.g., Reset 226). Pixel out 1160 can be coupled to pixel in 252 (FIG. 2).

As described with reference to FIG. 7, the amplifier input terminal polarities can be toggled/swapped dependent upon the mode of operation. In the implementation of FIG. 11, multiplexer 1144 can be used to perform a reconfiguration of the orientation of the current mirror formed by transistors 1136, 1138, 1140, 1142. Control signal 1148 (UGA) can be used to control the configuration of multiplexer 1144. Common gate node 1146 of transistors 1140 and 1142 can be coupled to the drain of transistor 1136 during the unity gain sampling mode of operation. Alternatively, the common gate node 1146 of transistors 1140 and 1142 can be coupled to the drain of transistor 1138 during the active reset mode of operation. The multiplexing of the node 1146 can define which cascode branch of the amplifier can serve as the input reference to the current mirror and which cascode branch of the amplifier can serve as the amplifier output.

In the implementation of FIG. 11, control signal 1148 (UGA) can also be used to control the configuration of multiplexer 1150. Multiplexer 1150 can be used to bridge connections for unity gain feedback during the unity gain sampling mode of operation by coupling node 1152 to the gate of transistor 1118. The multiplexer 1150 can also be used to couple the reference voltage 426 to the gate of transistor 1118 during the active reset mode of operation.

In the implementation of FIG. 11, control signal 1148 (UGA) can also be used to control the configuration of multiplexer 1154. Multiplexer 1154 can be used to establish the feedback loop during the active reset mode of operation by coupling node 1157 to the drain of transistor 1110. The multiplexer 1154 can also be used to couple a hard reset pulse at flush 1156 to the drain of transistor 1110. The hard reset pulse can be applied prior to the active reset mode in a hard reset technique. In an implementation of a hard reset technique, the gate of the reset transistor 1112 can be raised to $V_{DD}$ 1124, while its drain (which is coupled to $V_{dd}$Pixel) can be lowered below ($V_{DD}$ 1158–$V_{th}$), where $V_{th}$ is the threshold voltage of transistor 1112. The implementation of the hard reset technique can be similar to the flushed reset, as described above. In the implementation of FIG. 11, the hard reset technique can be used with the active reset mode of operation of the amplifier to suppress image lag.

Figure 12:
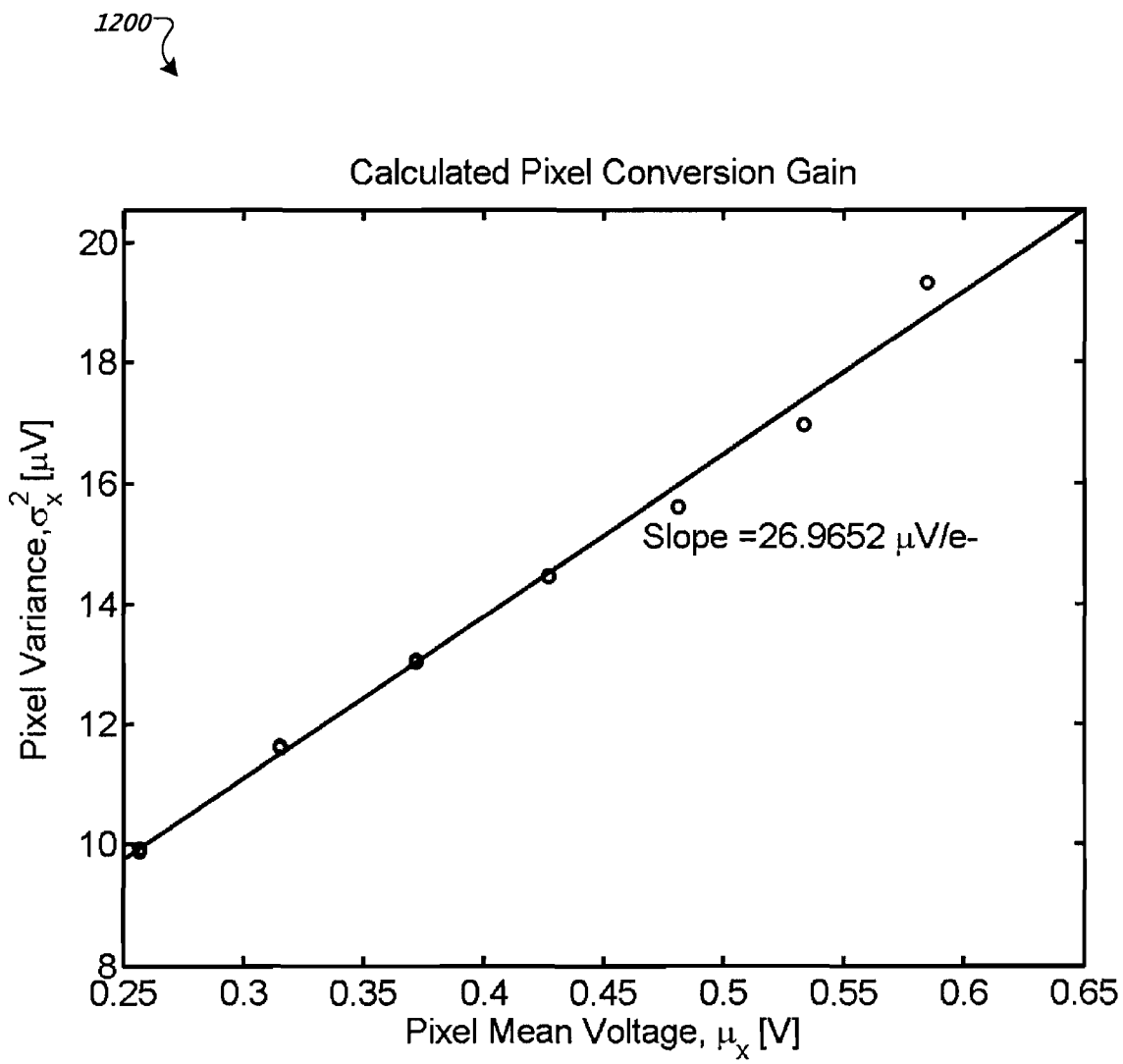
FIG. 12 is a graph of a conversion gain measurement for a pixel.

FIG. 12 is a graph 1200 of a conversion gain measurement for a pixel. The pixel can be included in the array 102 of FIG. 1. For example, in low light applications, the conversion gain for a pixel can provide an indication of the charge-to-voltage gain, and hence, the sensitivity of an image sensor. The conversion gain can refer to the signal generated per photon-induced electron collected by the reverse-biased junction of a photodiode (e.g., photodiode 822). The conversion gain can be measured in units of μV/e–. The conversion gain can also be used in the derivation of other performance metrics and may serve to express noise sources in terms of input-referred electrons.

Experimental measurements of the conversion gain may not be easily obtained by directly injecting a known charge into the sensitive photodiode node and measuring the resulting voltage, because the probing of the photodiode will likely alter the sense node capacitance leading to an erroneous estimation. Alternatively, an accurate conversion gain measurement can be obtained by reverting to statistical analysis based on the assumption that the overall image sensor noise under moderate illumination is dominated by photon shot noise, which follows a Poisson distribution. The basic equation relating conversion gain, $g_c$, with photon flux is given by Equation 12-1.

$$g_c = \frac{\partial x}{\partial \eta \Phi_{ph}}$$ Eq. 12-1 where
x is the measured pixel voltage
η is the sensor QE
$\Phi_{ph}$ is the photon flux.

The derivation of the conversion gain measurement can be explained by referring to Equations 12-2 to 12-5.

$$S = g_c S_{\eta\Phi}$$ Eq. 12-2

$$S_{\eta\Phi} = \sqrt{\eta\Phi}$$ Eq. 12-3

$$S = g_c \sqrt{\eta\Phi}$$ Eq. 12-4

$$g_c = S^2/x$$ Eq. 12-5

Eq. 12-2 can relate the standard deviation of the measured pixel voltage, S, with the standard deviation of the number of photo-generated electrons, $S_{\eta\Phi}$, by the conversion gain. Next, $S_{\eta\Phi}$, which follows a Poisson distribution, can be given as the square root of the mean as shown in Eq. 12-3. Assuming a linear conversion gain, the mean number of photo-generated electrons can also relate to the mean pixel voltage by the conversion gain, as shown in Eq. 12-5. Substituting the square root of Eq. 12-5 for $S_{\eta\Phi}$ in Eq. 12-2 can yield an equation for the conversion gain, which can be defined as the slope of the of the variance-mean graph, as is evident by Eq. 12-6.

Using this approach, the conversion gain for an image sensor can be measured by exposing the sensor array (e.g., array 102) to uniform monochromatic light at a moderate intensity (to ensure photon shot noise dominates), while modifying the integration time at regular intervals (avoiding saturation). FIG. 12 shows a graph of a sample set of measurements for the variance and mean from which the slope of the conversion gain can be measured. For example, an estimated sense node capacitance of 6 fF. can correspond to a conversion gain of 26.7 μV/e⁻. The experimentally measured conversion gain was calculated as 27 μV/e⁻, which agrees well with the theoretical estimation.

Figure 13:
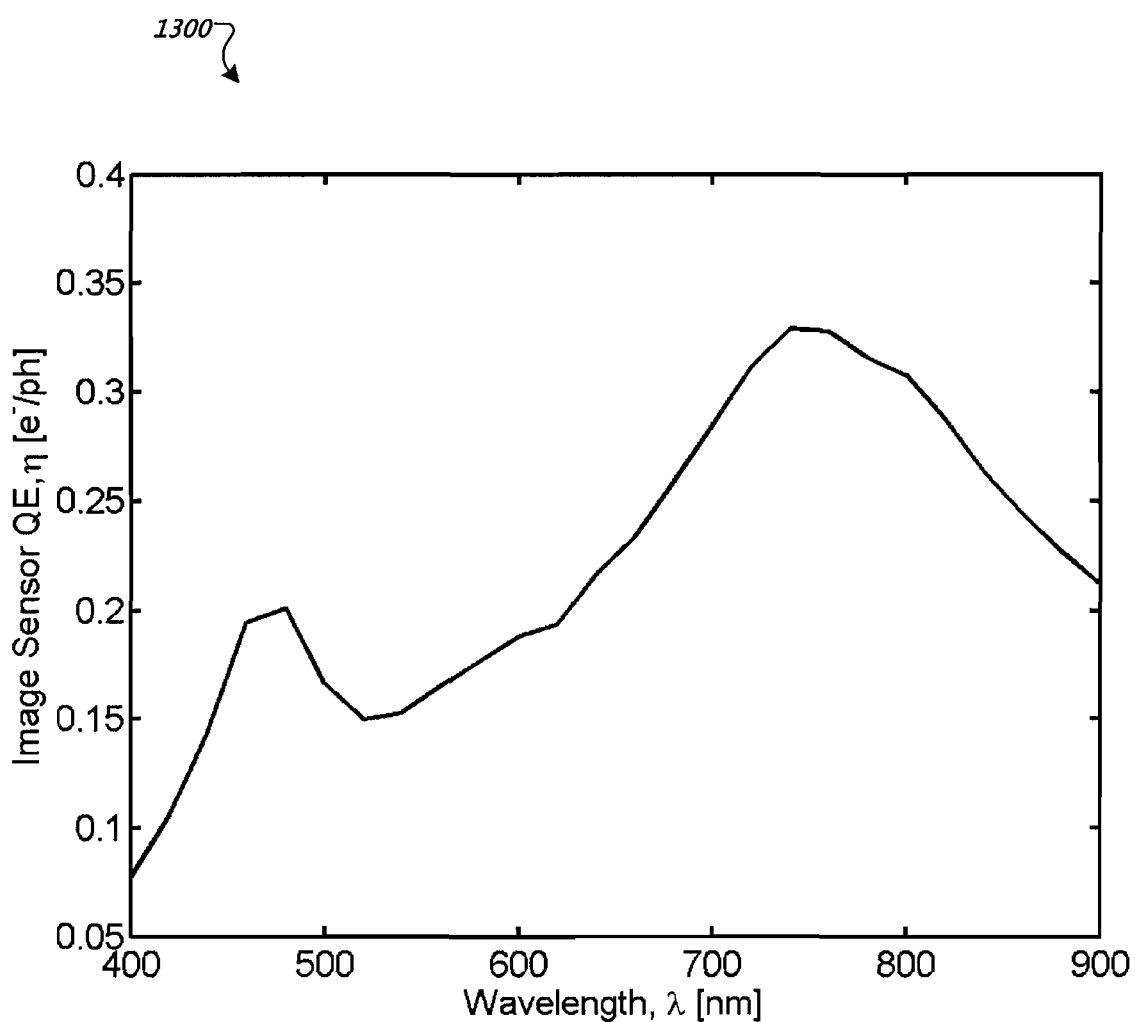
FIG. 13 is a graph of the measured quantum efficiency (QE) of an image sensor.

FIG. 13 is a graph 1300 of the measured quantum efficiency (QE) of an image sensor. The QE can be a measure of the photo-transduction capacity of a photodiode (e.g., photodiode 822) and can define the number of electrons generated per incident photon at a given wavelength. Experimental measurement of QE may require the use of a monochromator to irradiate both the image sensor and a calibrated reference photodiode with a set of discrete wavelengths of light. At each wavelength setting, the current generated by the calibrated reference photodiode can be measured along with the voltage response of the imager. These measurements can be used to calculate QE as shown by Equations 13-1, 13-2 and 13-2.

$$R = \frac{q\eta_{ref}\lambda}{hc}$$ Eq. 13-1

$$\Phi_{ph} = \left(\frac{I_{ref}}{A_{ref}q}\right)\frac{1}{\eta_{ref}}$$ Eq. 13-2

$$\eta = \left(\frac{x - x_{dark}}{g_c t_{int} A_{photodiode}}\right)\frac{1}{\Phi_{ph}}$$ Eq. 13-3

In Eq. 13-1, R is the responsivity of the photodiode, q is the charge of an electron, $\eta_{ref}$ is the reference photodiode QE, λ is the wavelength, h is Planck's constant, and c is the speed of light. The responsivity can be measured in A/W and is provided from the manufacturer in the form of a plot (calibration certificate) at different wavelengths of illumination. From Eq. 13-1, the QE of the calibrated photodiode can be calculated and substituted into Eq. 13-2 to obtain the photon flux, $\Phi_{ph}$, where $I_{ref}$ is the current measured from the calibrated photodiode, and $A_{ref}$ is the area of the reference photodiode. Next, the mean voltage measurement across the imager, x, can be subtracted from the mean dark current discharge, $x_{dark}$, to obtain the voltage resulting solely from the photon-induced charge collection. This measurement can then be translated into electrons by dividing by the conversion gain. Dividing this figure by the photodiode area, $A_{photodiode}$, integration time, $t_{int}$, and photonflux, can yield the QE as shown in Eq. 13-3. FIG. 13 shows a plot of the image sensor QE that can be obtained by following the described procedure. In graph 1300, the measured peak QE is 0.32 e⁻/ph at a wavelength of 720 nm.

In complete darkness, the presence of leakage current, which can be referred to as dark current, can lead to charge accumulation in a photodiode (e.g., photodiode 802). Under low light illumination, the signal-to-noise ratio (SNR) of an imager can be limited by a reduced photocurrent, and can be further degraded if dark charge generation is significant. The collection of these unwanted charges can reduce the well capacity of a photodiode, thereby limiting the volume available for photon-induced charge collection. For example, dark current can manifest itself in the temporal domain as dark current shot noise or in the spatial domain in the form of dark signal non-uniformity (DSNU).

The factors that can be attributed to dark current in a photodiode can be classified as either (1) leakage current due to thermal generation, or (2) leakage current due to defects. The first classification of dark current can be caused by thermal generation within the depletion region due to injection-diffusion current and generation-recombination current. This type of dark current can exhibit a strong dependence on the doping concentrations, bandgap, and temperature of the photodiode. This classification may be considered as the baseline, average, dark current value, which can be exhibited by each pixel across an array (e.g., array 102), and therefore, can be used in the calculation of shot noise. The second classification of defect-related or stress-induced dark current can be caused by factors relating to the fabrication process such as the presence of impurities, metal contamination, material defects, and interface defects. These defects can introduce stresses, resulting in the formation of intermediate energy levels within the silicon bandgap, which can lead to an increase in thermal generation. The sources of dark current defects may not be well understood causing difficulties in deriving accurate models and simulations, thus requiring experimental measurement for characterization. The second classification of defect-related dark current can results in DSNU due to the non-uniform occurrence of defects across the sensor array and due to the strong dependence of carrier generation on the properties of a particular defect. As a result, DSNU can be measured as a spatial variation similar to FPN.

Bright 'speckles' or spots, consistent from frame to frame, may be seen in the raw sensor images. These spots may be due to "stuck-at-ground" faults, or a high rate of dark charge generation. To investigate the cause, a series of dark flat-field images can be acquired at varying frame rates (300 frames per second (fps) to 3 fps) and observed. The intensity and concentration of 'speckles' in the series of dark flat-field images may increase with decreasing frame rate. This supports the theory that dark charges that are given the opportunity to accumulate over a longer integration period can appear brighter. Thus, the background non-uniformity observed in dark flat-field images can be largely attributed to DSNU. The calculation of DSNU will be described along with the description of fixed pattern noise (FPN) later in this document.

In the measurement of the first classification of dark charge generation (i.e., baseline value), dark current can be normalized within the area of a photodiode, and expressed as a current density $J_{dark}$. The image sensor can be exposed to a dark scene, and the average pixel discharge voltage can be measured and converted into an equivalent photon-induced charge by the conversion gain. Dividing this result by the integration time and photodiode area can result in the dark current density, as shown by Equation 14-1.

$$J_{dark} = \left(\frac{\bar{x}}{g_c}\right)\frac{q}{t_{int}A_{photodiode}}$$  Eq. 14-1

From this equation, the measured dark current density at a nominal rate of 30 fps and at a reverse-bias reset voltage under 1.2 V is 31.2 nA/cm².

Figure 14A:
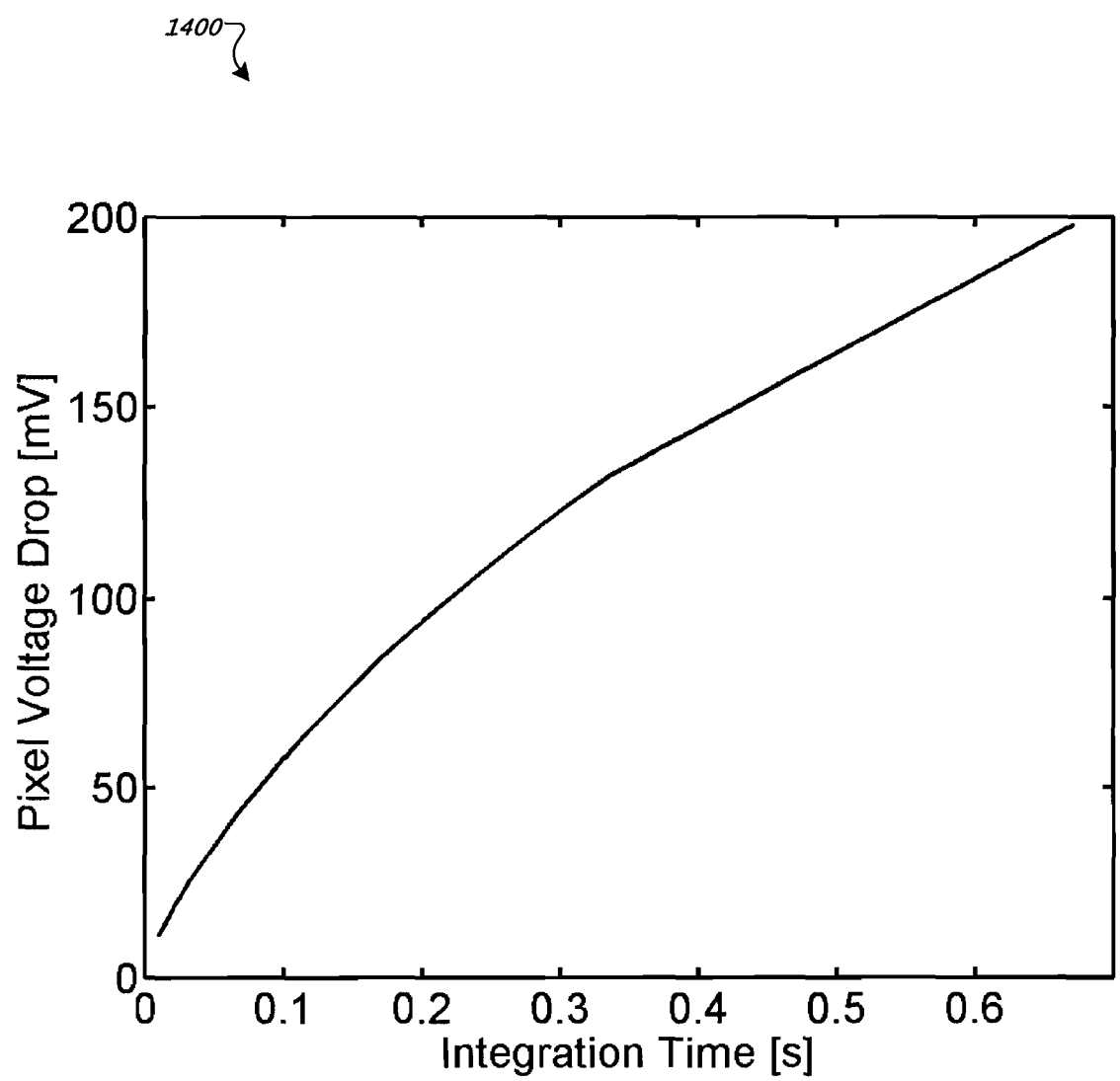
FIG. 14A is a graph of photodiode discharge voltage as a function of integration time.
Figure 14B:
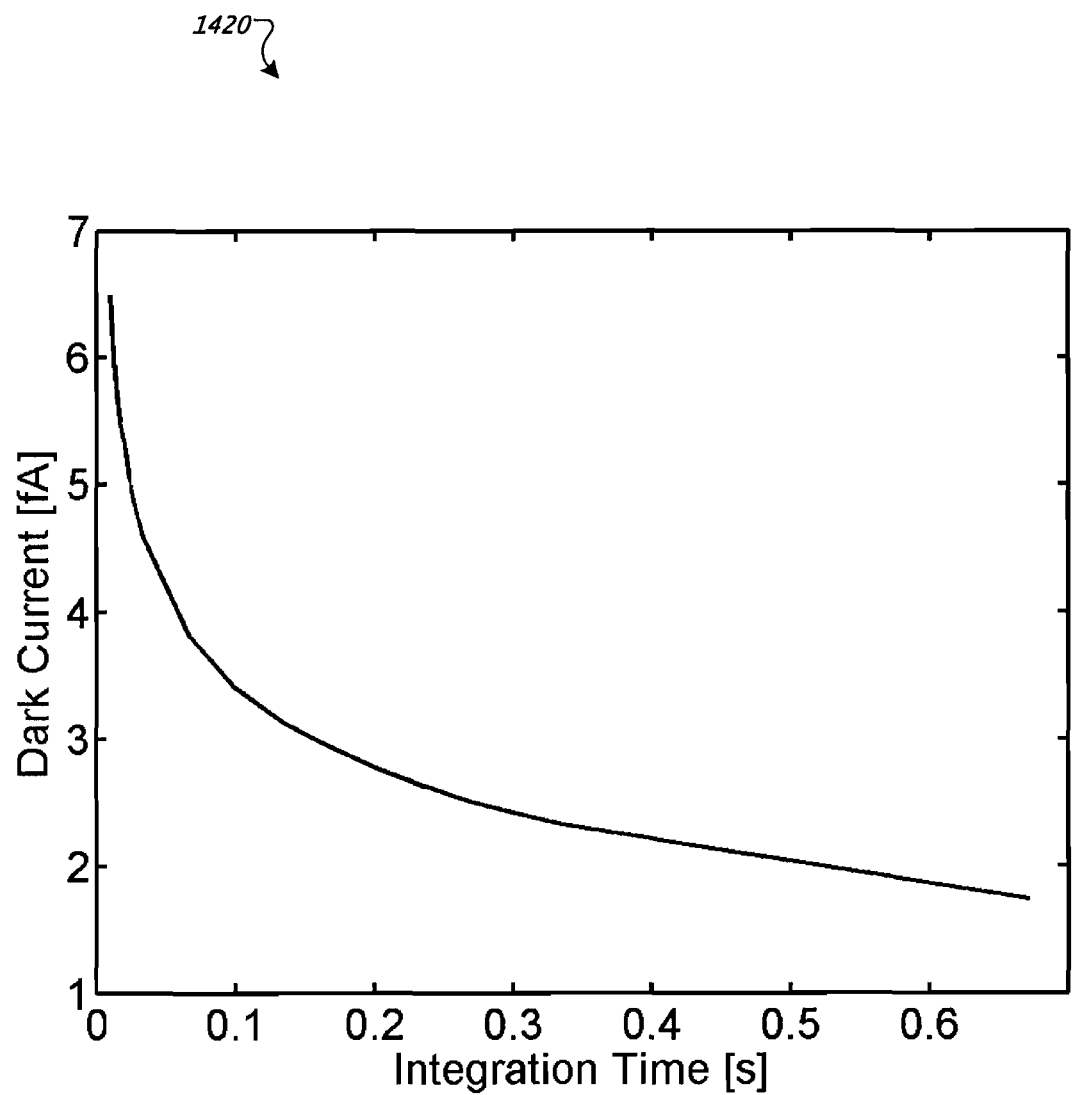
FIG. 14B is a graph of dark current as a function of integration time.

FIG. 14A is a graph 1400 of photodiode discharge voltage as a function of integration time. FIG. 14B is a graph 1420 of dark current as a function of integration time. To further characterize dark current, various experiments can be performed under different conditions. FIG. 14A shows the average pixel discharge voltage as a function of integration time. FIG. 14B shows the magnitude of dark current as a function of the integration time. The non-linear relationship of the photodiode discharge voltage with the integration time can be attributed to the fact that dark charge generation increases with reverse bias voltage. For short integration periods, a high reverse bias voltage can be sustained across an array, thereby leading to a wide depletion volume, wherein the accumulation of dark charges can occur. For long integration periods, the reverse bias voltage can gradually decrease over the duration of charge-integration. This can cause a simultaneous narrowing of the depletion width and a decrease in the well capacity of the photodiode.

Figure 15A:
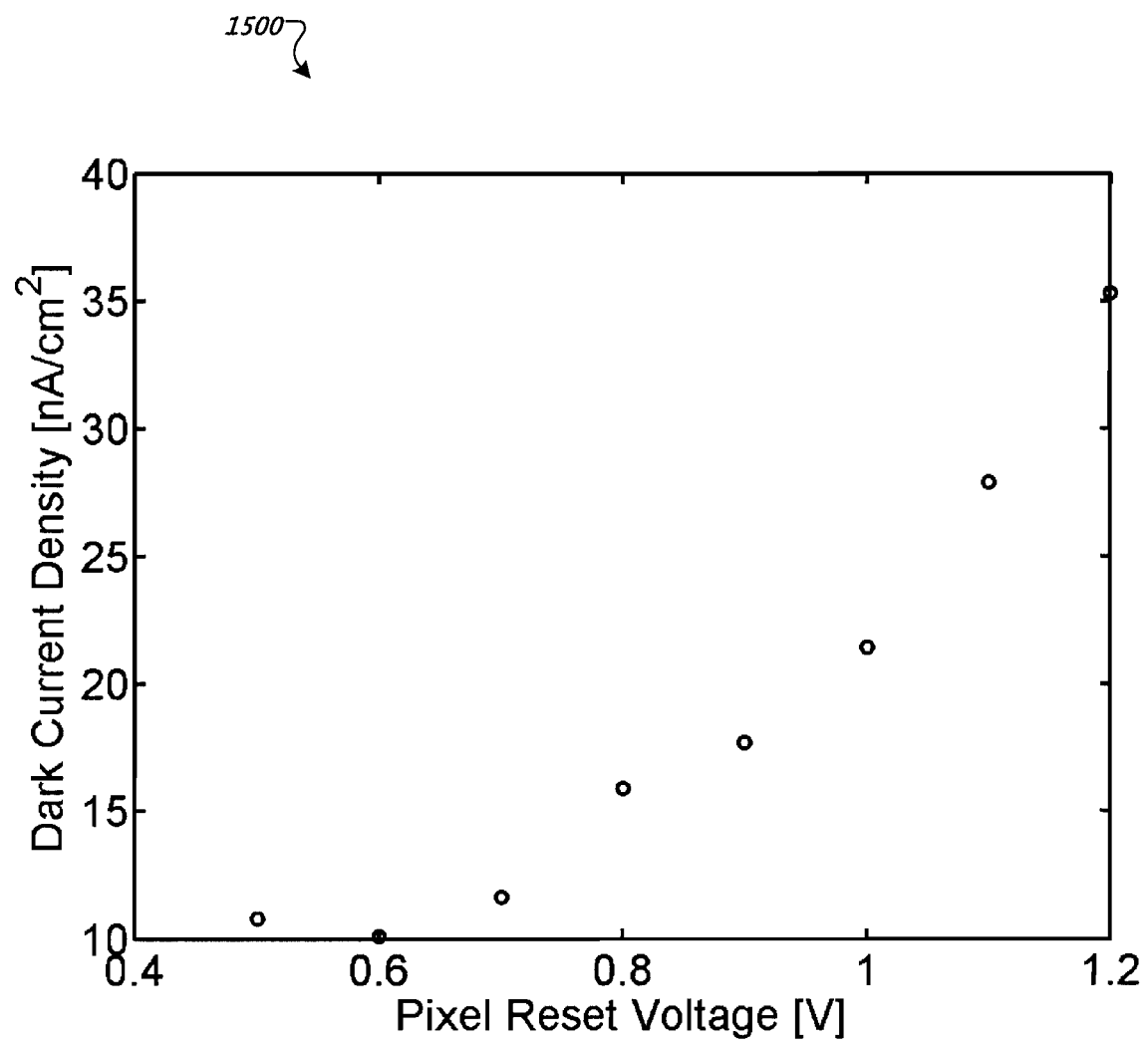
FIG. 15A is a graph of dark current density as a function of photodiode reverse bias reset voltage.
Figure 15B:
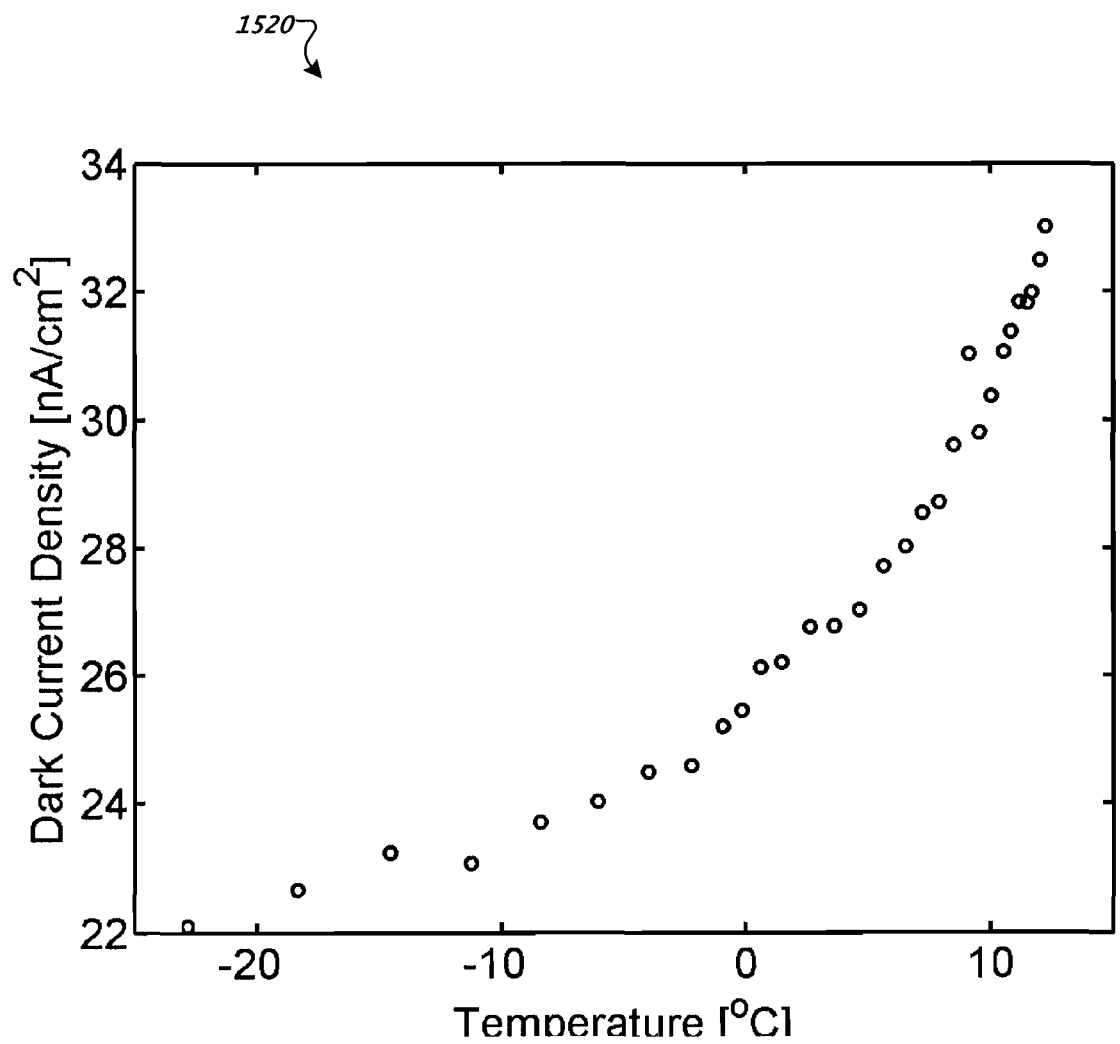
FIG. 15B is a graph of dark current density as a function of temperature.

An increase in dark charge generation with increased reverse bias voltage can also be justified by the Poole-Frenkel effect, whereby the emission rate of charges from traps intensifies as a result of the electric field in a highly doped substrate associated with the use of an advanced CMOS process. Dark charge generation due to thermal generation can also show dependence with temperature. To test this relationship, the surface of the chip is spayed with a static-safe freeze-spray (e.g., MG Chemicals®, Super Cold 134), and the resulting dark current density is measured at regular intervals as the chip returns to room temperature (as a rough approximation of the chip temperature, a ceramic thermocouple was placed in contact with the sensor surface). FIG. 15A is a graph 1500 of dark current density as a function of photodiode reverse bias reset voltage. FIG. 15B is a graph 1520 of dark current density as a function of temperature.

As previously described, spatial noise can be categorized as offset FPN or gain FPN (in the form of PRNU). In order to differentiate fixed, time-invariant, spatial noise from temporal noise, a large sample set of N frames can be successively acquired and the mean voltage of each pixel can be computed over time, thereby effectively 'averaging out' random frame-to-frame variations. This can result in a flat-field image of the FPN upon which two-dimensional analysis can be performed.

Figure 16:
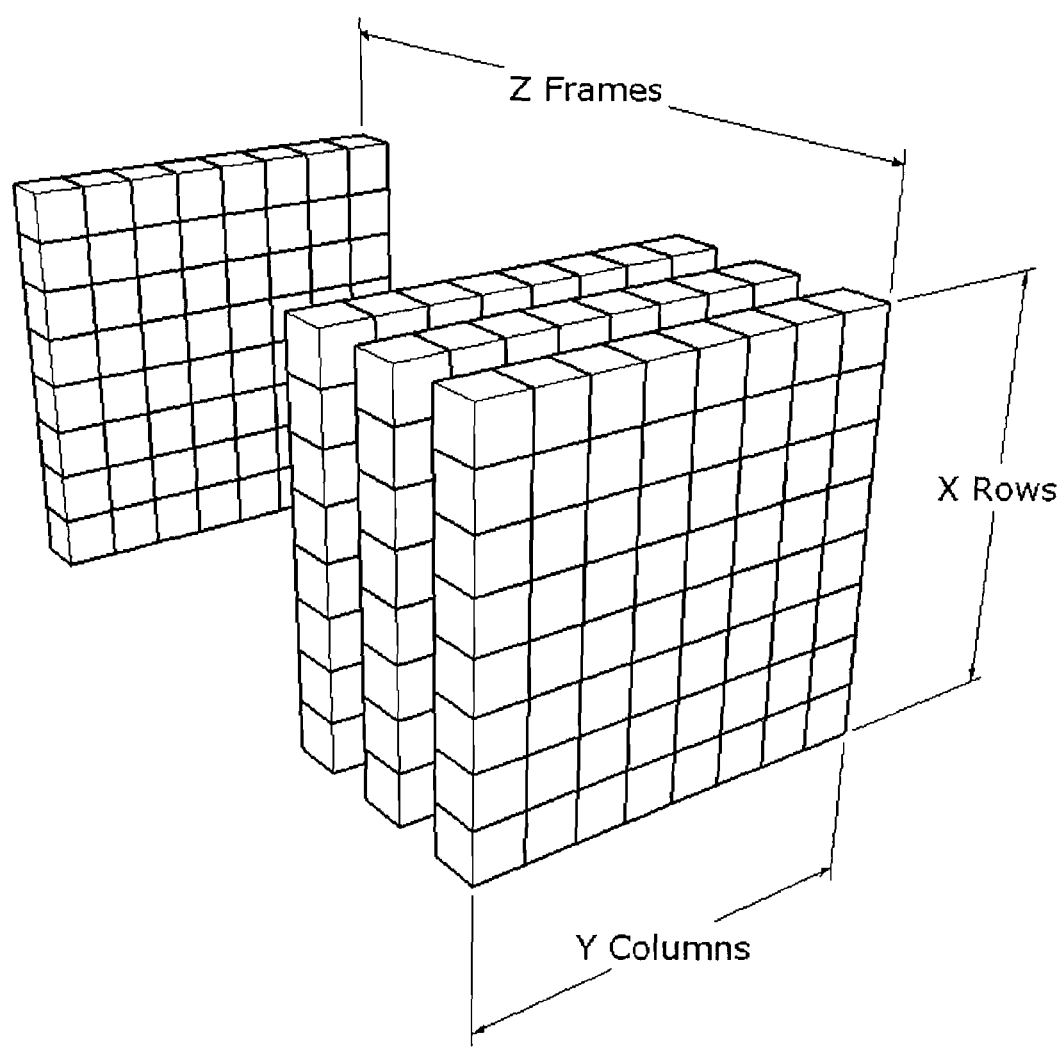
FIG. 16 shows frame acquisitions represented as projections onto an X-Y plane of a 3-D coordinate system.

FIG. 16 shows frame acquisitions represented as projections onto an X-Y plane of a 3-D coordinate system. In the implementation of FIG. 16, X can represent the number of rows, Y can represent the number of columns, and Z can represent the frame index (i.e., time). The process of temporal averaging for the calculation of FPN can be equivalent to computing the mean pixel voltage in the Z-direction.

For the calculation of FPN, FPN can be represented by the random, zero-mean variable $F_{i,j}$, given by Equation 16-1.

$$F_{i,j} = Y_j + X_{i,j}$$  Eq. 16-1 where
i represents the row index
j represents the column index
Y represents the column FPN component
X represents the pixel FPN component The use of this model can assume that $Y_j$ and $X_{i,j}$ are uncorrelated (due to their dependence on different device parameter variations), isotropic (space invariant), and that the correlation between pixels decreases with the distance that separates them. A derivation of the FPN components in an image composed of M rows and N columns can be given by Equations 16-2, 16-3, 16-4, and 16-5.

$$\overline{Y_j} = \frac{1}{M}\sum_{i=1}^{M} F_{i,j}$$  Eq. 16-2

$$\overline{X_{i,j}} = F_{i,j} - \overline{Y_j}$$  Eq. 16-3

$$\overline{\sigma_Y^2} = \frac{1}{N-1}\sum_{j=1}^{N} \overline{Y_j}^2$$  Eq. 16-4

$$\overline{\sigma_X^2} = \frac{1}{N(M-1)}\sum_{i=1}^{M}\sum_{j=1}^{N} \overline{X_{i,j}}^2$$  Eq. 16-5

The standard deviation in pixel FPN voltage can be expressed in terms of input referred electrons or, for the sake of comparison with other sensor designs, can be normalized by the well capacity and expressed as a percentage.

FIG. 17A-F show sensor images and accompanying surface plots for a reset frame (e.g., SHR 232), sample frame (e.g., SHS 228), and a CDS frame. The sensor were under a dark field exposure, acquired with a 16-bit ADC, and averaged over 1000 frames. Since

CDS=SHR−SHS

The reset frame (e.g., SHR 232), and the sample frame (e.g., SHS 228) can be displayed with inverted contrast).

As previously described, the dominant source of background uniformity can be largely due to DSNU. While DSNU can be a legitimate spatial artifact, its presence may not permit an accurate evaluation of the inherent FPN associated with the robustness of the pixel-level and column-level circuitry. This may be required in order to gauge the performance of the implemented active column sensor readout technique. As described with reference to FIG. 2, the composition of noise from the reset frame (SHR 232) can differ from that of the signal frame (SHS 228) in that it may not contain shot noise or DSNU/PRNU. This can be due to the fact that it can be sampled immediately following pixel reset (i.e., accumulation over an integration period does not occur). FIG. 17A-F show the effect of dark charge accumulation.

FIG. 17A-F can reconfirm that the majority of the FPN observed can be associated with DSNU. FIG. 17D is a surface plot of a reset frame of FIG. 17A. FIG. 17D shows a high degree of uniformity, while a surface plot (FIG. 17E) of the signal frame (FIG. 17C), and a surface plot (FIG. 17F) of a CDS frame (FIG. 17C) can demonstrate the degradation in image quality as an effect of DSNU. From the acquisition of the reset frame, measurements can yield a pixel FPN of 0.16% and a column FPN of 0.02% (inherent to the readout architecture). From the CDS frame, the measured pixel FPN is 3.04%, which can be considered to be mainly attributed to DSNU.

Figure 18:
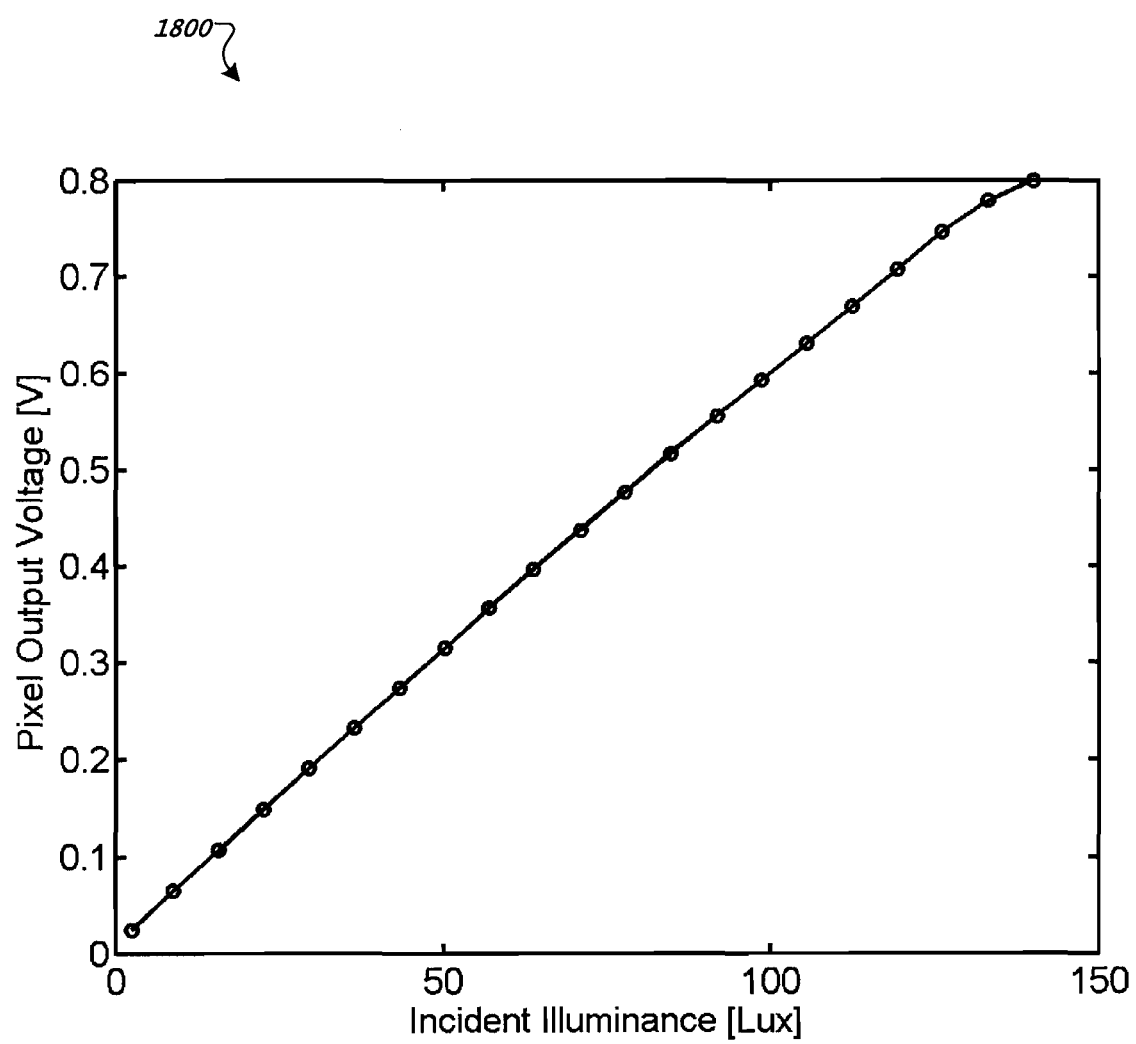
FIG. 18 shows average pixel output response as a function of illuminance.

FIG. 18 is a graph 1800 that shows average pixel output response (temporal averaging in the Z-direction, followed by spatial averaging) as a function of illuminance. The experimental procedure involved in measuring the linearity in pixel output response may require the acquisition of numerous frames at varying light intensities. The use of an integrating sphere to homogenize an output beam of a monochromator can be essential in obtaining a highly uniform scene. The intensity of the incident illumination can be varied by adjusting the input slit width of the monochromator in increments of 100 μm, and can be limited to a maximum width of 2000 μm to prevent imager saturation. As shown in FIG. 18, a wavelength of 555 nm can be selected in order to facilitate the conversion of photon flux into photometric illuminance units of Lux (i.e., photopic vision curve is normalized at 555 nm). The measured sensitivity is 0.275 V/Lux·s. At very high-illumination, the response uniformity can drop slightly due to the decrease in gain as a result of operating the amplifier near the lower limits of the input swing.

FIGS. 19A-B show a comparison of the normalized inter-column responses for an imager that can be implemented using the circuit 800 (FIG. 19A), compared to a conventional imager that can use the implementation of FIG. 2 (FIG. 19B). To test the uniformity in pixel response from column-to-column, the average response of all pixels within each column of the array can be computed and plotted against illuminance. For the sake of comparison with a conventional analog readout path, this calculation can be repeated with a 32×32, 3T CMOS APS imager also implemented in 0.18-μm technology. Note that the high levels of dark current can contribute to a mismatch in inter-column response (although this may not be immediately apparent due to the averaging in the y-direction), however more significant, is the high linearity in response.

Figure 20:
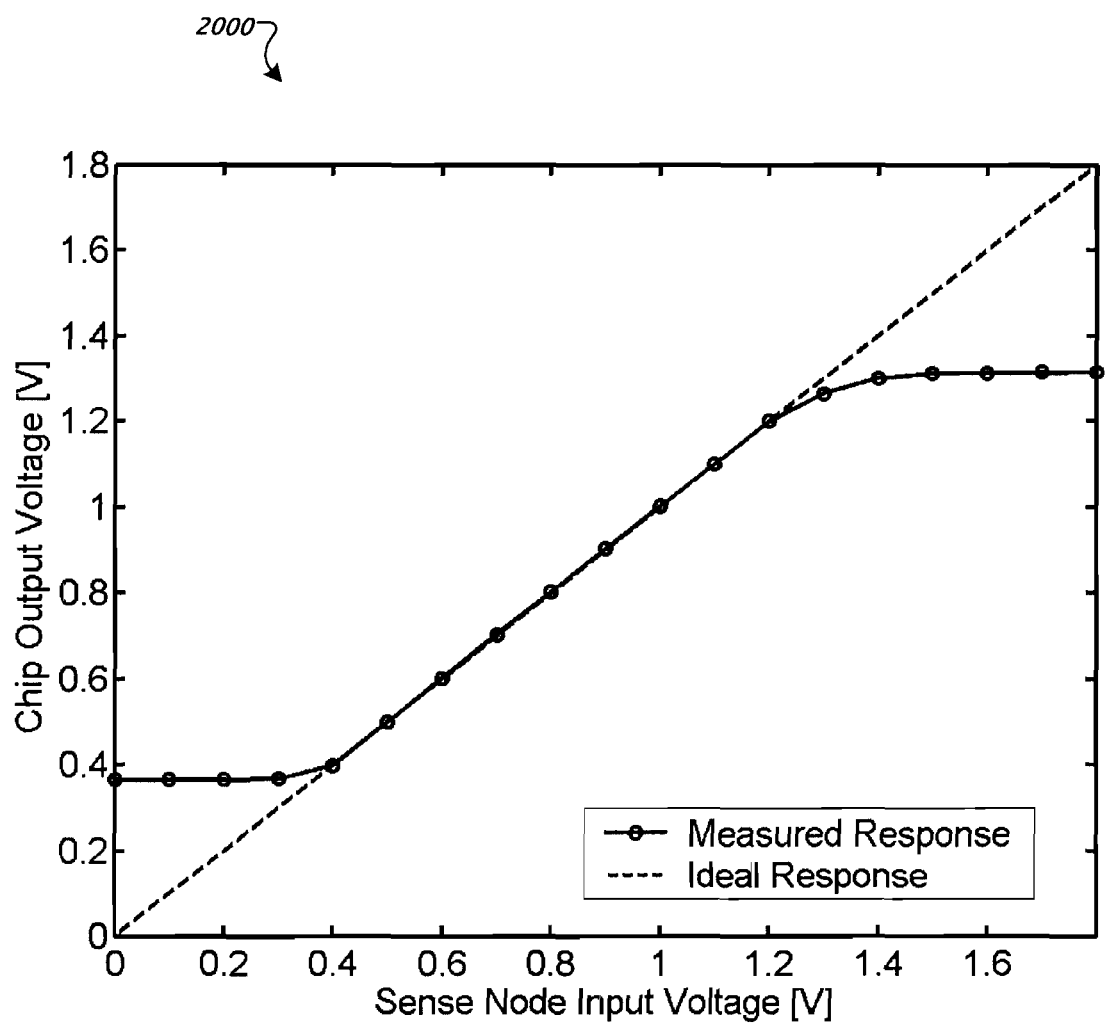
FIG. 20 is a graph of the DC transfer characteristic of the analog readout path of the circuit of FIG. 8.

FIG. 20 is a graph 2000 of the DC transfer characteristic of an analog readout path of circuit 800. In order to test the uniformity of the analog readout path, which can include the partitioned pixel amplifier and the switched-capacitor column-level and chip-level amplifiers, the DC transfer characteristic can be measured using the 32 test pixels implemented at the edge of the array. A series of gradually increasing DC voltages can be applied to the front end analog signal chain and the resulting sampled waveform at each level can be measured. The measured non-linearity is 0.9% within the allowable signal swing.

An improvement in reset noise can be expected when using the implementation of the active reset technique described with reference to FIGS. 7, 8, and 11. The improvement in reset noise performance using a high-gain amplifier in negative-feedback configuration, can be due to the instantaneous sensing of the photodiode voltage and the active control of the resetting current. Unlike FPN, reset noise can be a temporal artifact, which can require calculating fluctuations in the time-domain (i.e., from frame-to-frame). Referring to the 3-D representation shown in FIG. 16, based on the acquisition of a large sample set of N frames, temporal noise can be measured in the Z-direction. A spatial average can then be computed to obtain an indication of the mean temporal noise performance.

Extracting reset noise amidst the remaining temporal noise may not be performed directly and may require the use of a double sampling technique. In a rolling shutter readout method, pixels can be accessed in a 'read-first reset-later' fashion. Therefore, CDS may not constitute a full subtraction of correlated sources because the temporal reset noise in the signal frame (e.g. SHS 228) and the reset frame (e.g., SHR 232) can be derived from different frames (doubling the reset noise contribution). However, applying the principle behind true CDS, the reset noise can be extracted by obtaining multiple, non-destructive, samples of the pixel reset voltage during the same frame (i.e., two samples of SHR). By obtaining two samples (e.g., for X1, X2,) immediately following the pixel reset, two representations of the pixel voltage can be obtained, each of which can be individually made up of two components: a component R, used to represent reset noise, and a component O used to represent signal path noise, as shown by Equations 21-1 and 21-2.

$$X_1 = R_1 + O_1 \rightarrow \sigma_{X_1}^2 = \sigma_{R_1}^2 + \sigma_{O_1}^2 \qquad \text{Eq. 21-1}$$

$$X_2 = R_2 + O_2 \rightarrow \sigma_{X_2}^2 = \sigma_{R_2}^2 + \sigma_{O_2}^2 \qquad \text{Eq. 21-2}$$

Within a sample, R and O can be assumed to be independent and uncorrelated. However between $X_1$ and $X_2$ (derived from the same frame), the reset noise components can be considered fully correlated (i.e., $R_1 = R_2$). Thus, a subtraction of $X_2$ from $X_1$ can eliminate the common reset component, resulting in Equation 21-3 describing the remaining signal path noise.

$$\begin{aligned} X_d &= X_1 - X_2 \\ &= O_1 - O_2 \rightarrow \sigma_{X_d}^2 = \sigma_{O_1}^2 + \sigma_{O_2}^2 \end{aligned} \qquad \text{Eq. 21-3}$$

In this analysis, it can be assumed that $O_1$ and $O_2$ are independent and uncorrelated. Therefore, the inclusion of a cross correlation term can be omitted. It can also be assumed that the variance of $O_1$ and $O_2$ are equivalent, since identical signal chains can be used during readout. With these assumptions, Eq. 21-3 can be simplified into a representation of the signal path temporal noise, which when substituted into Eq. 21-1, can provide Equations 21-4, and 21-5 for the reset noise power.

$$\sigma_{X_1}^2 = \sigma_{X_d}^2 / 2 \qquad \text{Eq. 21-4}$$

$$\sigma_{R_1}^2 = \sigma_{X_1}^2 - \sigma_{X_d}^2 / 2 \qquad \text{Eq. 21-5}$$

The experimental setup for measuring temporal reset noise may require minimizing noise interference. Experimentation is performed under dark conditions. Unused peripheral equipment on the lab bench is shut off, and shielded co-axial cables are used for the connection of a daughterboard video amplifier output (configured solely for the acquisition of data from the SHR readout path) to a 16-bit ADC. Due to the limited sampling rate of the high-precision ADC, only a single column of pixels can be considered in the analysis in order achieve a high sampling rate between consecutive samples (a full frame operation would incur a large delay between samples due to column serial readout, and in the process, introduce the accumulation of dark charges). Before beginning experimentation, it can be verified that the test fixture board level noise is in fact lower than the estimated noise measurement. This can be performed by driving the input of the analog video amplifier with a low noise DC voltage and measuring the output voltage digitized by the ADC. One thousand frames of consecutive reset samples from a single column of 92 pixels can be obtained and the analysis of reset noise from Eq. 21-5 can be performed for each pixel.

Figure 21:
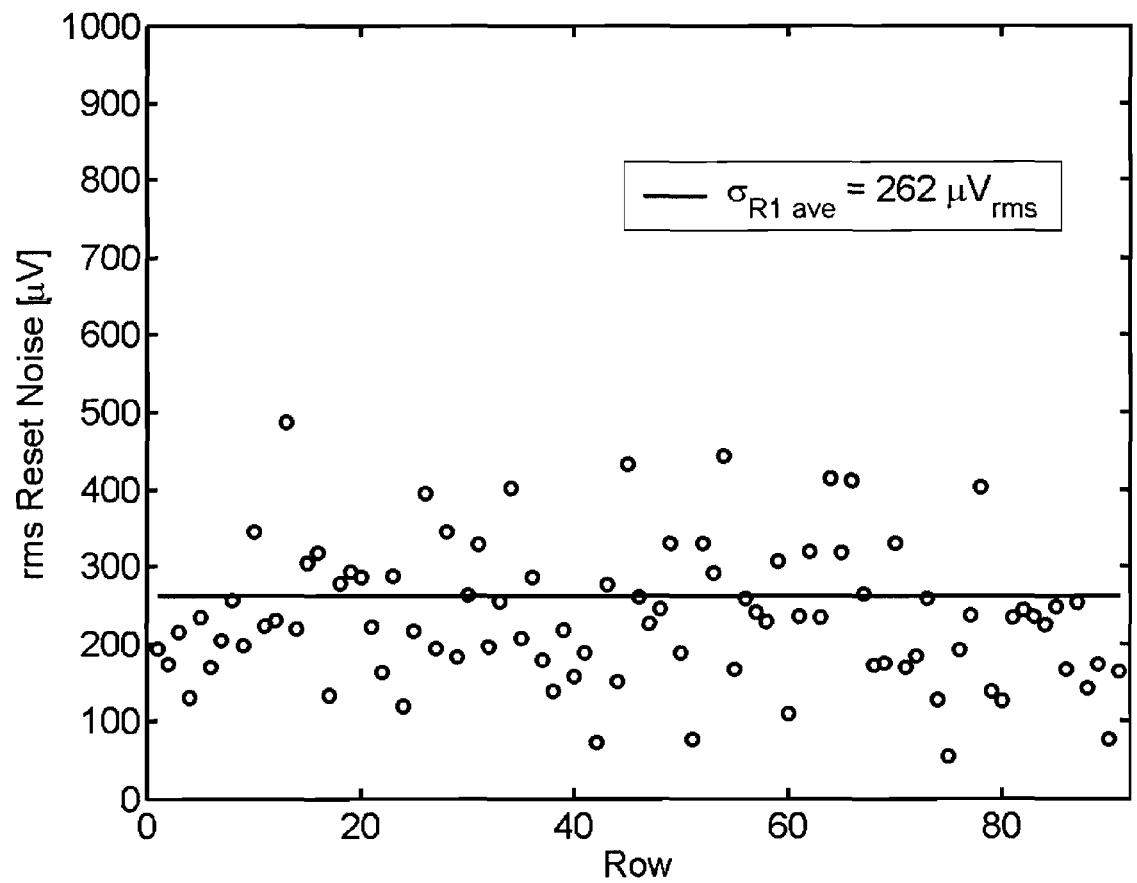
FIG. 21 is a graph of the individual pixel root-mean-square (rms) reset noise voltages within a column.

FIG. 21 is a graph 2100 of the individual pixel root-mean-square (rms) reset noise voltages within a column. FIG. 21 shows the average level highlighted with a horizontal line. The average rms reset noise voltage is 262 µV, which translates to an input referred noise of 9.7 electrons.

FIGS. 22A-B are graphs of measured rest voltage under dark illumination (FIG. 22A) and bright illumination (FIG. 22B). To test image lag, consecutive samples of the SHR reset voltage are plotted over 5 frames under dark illumination conditions in FIG. 22A, and under bright illumination conditions in FIG. 22B. No significant image lag can be observed from either case.

Read noise can represent the fluctuations in a sampled voltage, which includes the following noise sources: reset noise, and signal path noise (amplifier thermal and flicker noise, interference noise, substrate noise, supply noise, and quantization noise). Quantization noise can be assumed negligible in this case due to the use of a high-precision ADC. Read noise is not to be confused with signal path noise presented in the previous section, as the latter does not include reset noise. Note that photon and dark current shot noise contributions are not accounted for. Therefore, in order to eliminate accumulation, similar to the previous approach, read noise can be accurately measured by sampling the pixel voltage immediately following the reset phase under complete darkness (equivalent to the measurement of $X_1$ or $X_2$ from the previous section).

Figure 23:
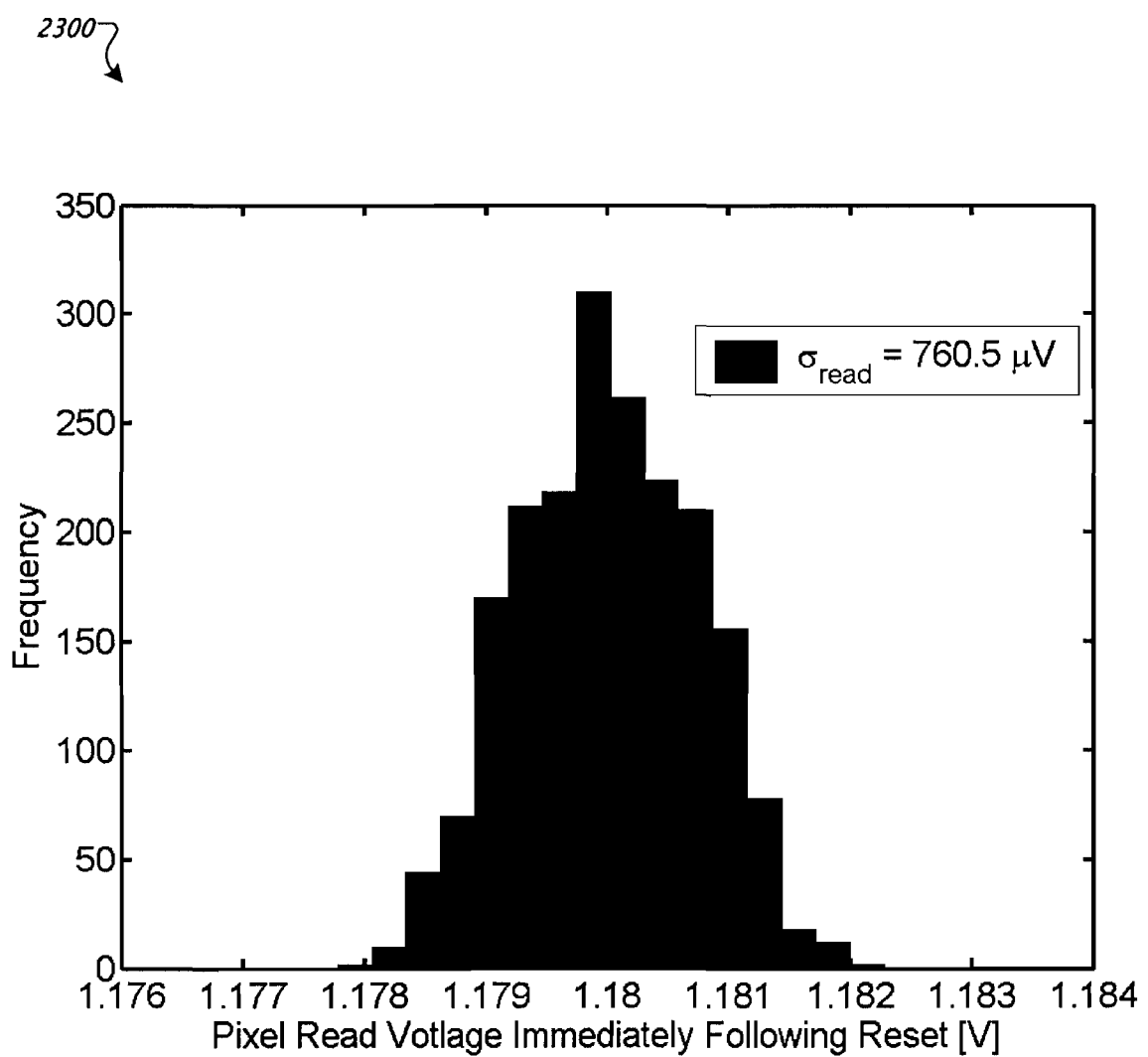
FIG. 23 is a graph of a histogram of a single pixel reset voltage over one thousand samples.

FIG. 23 is a graph 2300 of a histogram of a single pixel reset voltage over one thousand samples. This histogram can show the normal, Gaussian distribution of read noise. The total measured read noise is measured as 761 µV. From Eq. 21-1, this equates to a signal path (i.e., signal path noise) of 714 µV.

Figure 24:
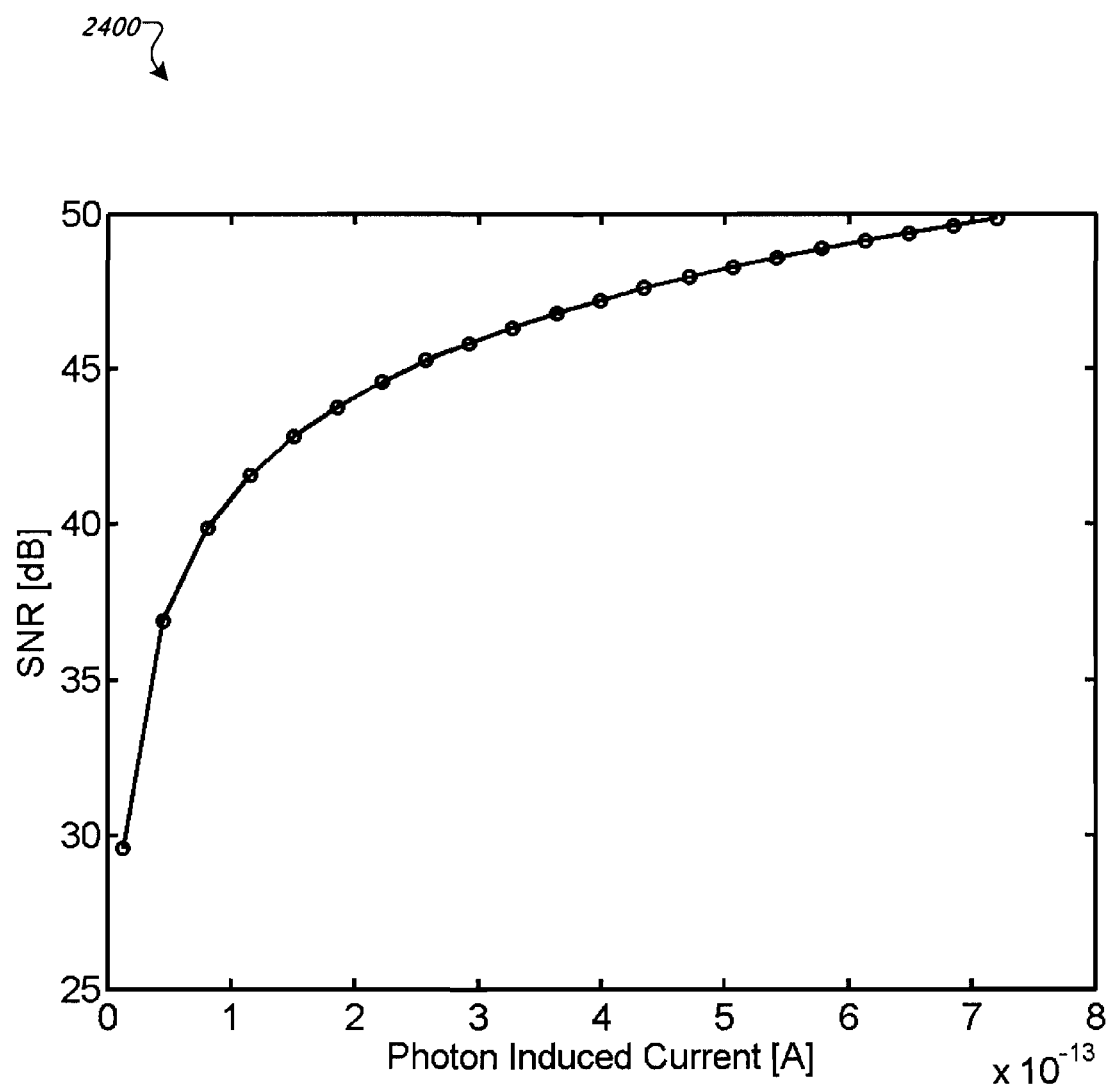
FIG. 24 is a graph of the measured SNR as a function of photocurrent.

The SNR can provide a measure of the signal integrity at different levels of illumination and can be a critical figure of merit often used to judge overall image quality. In CMOS imagers, SNR can be expressed as the ratio of the input signal power to the total input-referred noise power. The input signal can be expressed as a photocurrent. Read noise can be referred to the pixel front-end by dividing by the gain of the readout path (in this case unity gain), and expressed in electrons by dividing by the conversion gain. The total noise power can be composed of photon shot noise, dark current shot noise, and read noise, each expressed in term of electrons$^2$, and multiplied by the term $(q/T_{int})^2$ to obtain an equivalent current noise power. The calculation of SNR, which summarizes the noise contributions considered, can given by Equation 24-1.

$$SNR(i_{ph}) = 10\log\left(\frac{i_{ph}^2}{\left(\frac{q}{T_{int}}\right)^2\left(\frac{T_{int}(i_{ph}+i_{dark})}{q}+\sigma_{read\ e}^2\right)}\right) \quad \text{Eq. 24-1}$$

where
$i_{ph}$ refers to the input photocurrent
$i_{dark}$ is the dark current
$\sigma_{read\ e}$ is the input-referred read noise FIG. 24 is a graph 2400 of the measured SNR as a function of photocurrent. A peak SNR of 50 dB is measured at a photocurrent of 719 fA, or equivalently, at a photo-induced discharge voltage of 0.8V (full well discharge). As previously described, the value of SNR at high illumination can be essentially limited by dominant photon shot noise. More significant to the application of high-sensitivity or low-light imaging is the SNR at low illuminations, where the magnitude of the photocurrent can approach that of the noise floor.

The dynamic range of an image sensor can quantify the range of illumination that can be captured in a scene. As CMOS technology advances and feature sizes scale down, maintaining a high dynamic range in CMOS imaging can become increasingly challenging due to the reduced QE, increase in dark/gate leakage current, and the reduction in supply voltage. Dynamic range can provide a measure of image quality by defining the ratio of the largest non-saturating current to the smallest detectable signal (i.e., noise under dark conditions when $i_{ph}=0$). The measurement of dynamic range can be given by Equation 25-1.

$$\text{Dynamic Range} = 20\log\left(\frac{Q_{max}\left(\frac{q}{T_{int}}\right)-i_{dark}}{\left(\frac{q}{T_{int}}\right)\sqrt{\left(\frac{T_{int}i_{dark}}{q}+\sigma_{read\ e}^2\right)}}\right) \quad \text{Eq. 25-1}$$

where $Q_{max}$ represents the full well capacity of the photodiode, and the remaining terms are equivalent to those described for SNR, in Eq. 24-1. The term $Q_{max}(q/T_{int})$ is analogous to the theoretical maximum measurable photocurrent signal before saturation. However, as previously described, the total well capacity cannot be fully utilized for the collection of photon-induced charges due to the simultaneous accumulation of dark charges (dark current accounted for by the subtraction of the $i_{dark}$ term). The measured dynamic range of the sensor is 54 dB.

In some implementations, both the circuit 800 of FIG. 8 and the circuit 1100 of FIG. 11 can be used in a digital imaging system under low illumination levels. For example, the contact detection of cell specimens directly coupled to the sensor surface can exhibit low illumination and low contrast conditions. Therefore, an imager may be required that exhibits high sensitivity and low noise outputs.

In some implementations, the circuits 800 and 1100 can be used in applications that require low light detection and high sensitivity. Examples of such applications can include scientific applications related to astronomy and outer space. Other applications can be medical imaging applications that can include in vivo imaging, microscopy, and biochemical light-protocols.

Image sensors can be devices that can accumulate and convert photon-induced charges in a substrate into a representative electrical signal. Collecting photon-induced charges over a time period (exposure period) can be referred to as charge integration. The integration of charges over time and their conversion to a representative electrical signal is the basic principle of an image sensor. Image sensors can be configured in a two-dimensional structure consisting of rows and columns of individual sensor elements, which can be referred to as pixels. Image sensors can be incorporated into many types of digital imaging devices (e.g., digital cameras).

One type of an image sensor can be a charge coupled device (CCD). A CCD can include an array of linked, or coupled, light-sensitive capacitors per pixel. CCD imagers can provide low noise performance, high fill factor (ratio of photosensitive area to the total pixel area), high photon-to-charge conversion efficiency (quantum efficiency), and high sensitivity. These characteristics can be beneficial for digital imaging.

CCDs can be produced using a customized fabrication process, which can be optimized for enhancing imaging performance. This customized fabrication process, however, may preclude the integration of additional analog and/or digital support circuitry on the same semiconductor die.

Another type of image sensor can be a CMOS sensor. CMOS imagers can be fabricated from an array of CMOS sensors, in a similar manner as a CCD imager, where each sensor element can also be referred to as a pixel. CMOS imagers can be less expensive and consume less power than an equivalent CCD imager. CMOS imagers can be fabricated using standard fabrication processes employed in the microelectronics industry, thus the reduced cost. This can allow for analog and/or digital circuitry to be included with a light sensitive element, all on the same semiconductor die. Therefore, advanced sensor functionality can be implemented within each pixel in the imager in the form of real-time processing within the focal plane. Examples of this advanced functionality are wide dynamic range sensing, electronic shuttering, object tracking, edge detection, image compression, and motion detection. As a result, CMOS imagers can be used in applications ranging from low power, portable electronics (e.g., cellular phone) to high performance, high resolution scientific applications (e.g., machine vision, radiant tolerant imaging).

A CMOS imager can be formed from an array of pixels, where each pixel can include a light sensitive element and associated circuitry. The circuitry can be used for the reset and readout of accumulated charge within the light sensitive element. For example, the light sensitive element can be a photodiode or a photogate. A photodiode is a semiconductor diode that includes a light sensitive component, which allows it to function as a photodetector. A photogate, in the field of solid-state imaging, can refer to a structure which is fabricated on a silicon substrate (basically a modified polysilicon MOS capacitor) which is able to collect photo generated charges. The phototransistor can be in a transparent package and is turned ON by light illuminating the base. The light sensitive element can be coupled to the input of an active readout amplifier. This can result in what is referred to as an "active pixel sensor" or APS.

Impinging photons from an optical image can generate electron-hole pairs in a substrate, which can be separated and collected by the light sensitive element. This charge accumulation is proportional to the intensity and duration of the illumination irradiating the light sensitive device. The accumulated charges can then be converted into a representative electrical signal, which can be, in some implementations, non-destructively read by an active readout amplifier.

The rolling shutter readout method can be used, for example, in video applications. In other implementations, a full frame electronic shutter mode may be used to simultaneous sample the pixel values for all pixels in an array. In this mode, the sampled voltage from each pixel in a digital imaging system can be shifted to a local storage site within the pixel. This mode can be used for snapshot or strobe applications. In other implementations, an adaptive exposure control method may be used to readout the pixel values. In this mode, the sampled voltage from each pixel in a digital imaging system can be read non-destructively. This can allow a user, for example, to read the sampled image and determine if more charge integration by a photodetector is needed on a pixel by pixel basis or on an entire array basis. This mode can be used in applications that may require an extremely large dynamic range of sampled and captured information.

The correlated double sampling (CDS) technique may not allow for correlated subtraction of all noise sources that may be introduced in the integration, sampling, and resetting of the photodiode. Double sampling may be effective at reducing offsets in a signal readout path but may not be effective at reducing any random noise. In other implementations, an alternate correlated double sampling technique may include an additional sampling transistor and hold capacitor (or an equivalent node capacitance) in a pixel circuit. This would allow for the sampling and storage of the pixel reset voltage and the pixel signal voltage for the same frame, resulting in a more accurate correlated double sampling technique. The pixel circuit used for this technique can be referred to as a four transistor (4T) CMOS APS circuit. However, this implementation can result in a reduction in pixel fill factor.

A number of implementations have been described. Nevertheless, it will be understood that various modifications can be made without departing from the spirit and scope of the disclosed implementations. Accordingly, other implementations are within the scope of the following claims.

What is claimed is:

1. A method for reducing circuit noise, comprising: providing an active reset circuit and an active column sensor readout circuit; wherein said active reset circuit and said active column sensor readout circuit share common circuitry; wherein said common circuitry is configured as an amplifier wherein said active reset circuit is configured to decrease ambiguity in reset voltage, and said active column sensor readout technique is configured to decrease pixel level gain fixed pattern noise.

2. The method of claim 1, wherein said active reset circuit is configured for use during a reset phase, and said active column sensor readout circuit is configured for use during a sampling phase.

3. The method of claim 1, wherein said amplifier is configured to provide a unity gain to said active column sensor circuit and configured to provide a greater than unity gain to said active reset circuit.

4. The method of claim 3, wherein said amplifier increases an effective capacitance for suppression of thermal reset noise when configured to provide a greater than unity gain to said active reset circuit.

5. An imaging apparatus comprising: (a) an array of imaging pixels, said imaging pixels being arranged in rows and columns, wherein each imaging pixel comprises a light-sensitive photodiode, a reset transistor, a switch in a feedback path, at least one transistor of a differential pair of transistors belonging to a partitioned amplifier having a plurality of transistors, and a row select transistor; and (b) peripheral circuitry comprising transistors of said partitioned amplifier, and multiplexers; wherein said partitioned amplifier is configured to provide power to an active reset circuit in one phase of imaging, and an active column sensor readout circuit in another phase of imaging wherein said switch comprises a pass transistor or a transmission gate.

6. The apparatus of claim 5 wherein said row select transistor and said switch of an imaging pixel are activated by a same row select control signal.

7. The apparatus of claim 5 wherein said row select control signal determines which row of imaging pixels within said array are connected to said peripheral circuitry.

8. A method for reducing circuit noise, comprising: providing an active reset circuit and an active column sensor readout circuit; wherein said active reset circuit and said active column sensor readout circuit share common circuitry, wherein said common circuitry is configured as an amplifier; wherein said active reset circuit is configured to decrease reset noise, and said active column sensor readout circuit is configured to decrease pixel level gain fixed pattern noise.

9. A method for reducing circuit noise, comprising: providing an active reset circuit and an active column sensor readout circuit; wherein said active reset circuit and said active column sensor readout circuit share common circuitry, wherein said common circuitry is configured as an amplifier; wherein a feedback reset loop is disabled when said active column sensor readout circuit is operational, thereby reverting to a lower effective capacitance dominated by a photodiode capacitance, permitting a high charge-to-voltage gain/sensitivity for readout.

* * * * *